US007219068B2

(12) United States Patent
Zelek et al.

(10) Patent No.: US 7,219,068 B2
(45) Date of Patent: May 15, 2007

(54) METHOD AND SYSTEM FOR PRODUCT OPTIMIZATION

(75) Inventors: Carolyn Zelek, Scottsdale, AZ (US); John King, Northville, MI (US); Mahesh Himatlal Vora, Farmington Hills, MI (US); Nathan R. Soderborg, Ann Arbor, MI (US); Toni Brockers, Duesseldorf (DE)

(73) Assignee: Ford Motor Company, Dearborn, MI (US)

( * ) Notice: Subject to any disclaimer, the term of this patent is extended or adjusted under 35 U.S.C. 154(b) by 1100 days.

(21) Appl. No.: 10/043,696

(22) Filed: Jan. 11, 2002

(65) Prior Publication Data

US 2003/0040954 A1 Feb. 27, 2003

Related U.S. Application Data

(60) Provisional application No. 60/275,498, filed on Mar. 13, 2001.

(51) Int. Cl.
G06F 17/30 (2006.01)
(52) U.S. Cl. ............................ 705/7; 705/10; 700/97
(58) Field of Classification Search ............ 705/10, 705/7
See application file for complete search history.

(56) References Cited

U.S. PATENT DOCUMENTS

| 5,287,284 | A | * | 2/1994 | Sugino et al. ............ 700/97 |
| 5,311,759 | A | | 5/1994 | Mangrulkar et al. |
| 5,452,218 | A | | 9/1995 | Tucker et al. |
| 5,581,466 | A | * | 12/1996 | Van Wyk et al. ........ 700/95 |
| 5,715,181 | A | | 2/1998 | Horst |
| 5,731,572 | A | * | 3/1998 | Winn .................... 235/70 R |
| 5,765,137 | A | * | 6/1998 | Lee ........................ 705/7 |
| 5,777,841 | A | | 7/1998 | Stone et al. |

(Continued)

FOREIGN PATENT DOCUMENTS

WO    WO 0133393 A2 *  5/2001

OTHER PUBLICATIONS

"Quantifying design and manufacturing robustness through sstochastic optimization techniques" by Kazmer et al, Proceedings of the 1996 ASME Design Engineering Technical Conferences and Computers in Engineering Conference, Aug. 1996.*

(Continued)

*Primary Examiner*—Romain Jeanty
(74) *Attorney, Agent, or Firm*—Brooks Kushman, P.C.; Gary A. Smith

(57) ABSTRACT

A method and computer-implemented system for optimizing a product. Based on the "voice of the customer", aspects of the product that are critical to the customer satisfaction, and target values, therefore, are identified. Aspects are characterized in terms of their contributing factors. Each contributing factor is characterized in a transfer function in terms of control and noise factors impacting the contributing factors. Contributing factors are optimized during product design by shifting nominal design values for control factors with respect to the transfer function such that target contributing factors are attained with minimum variability due to existing noises and variability in control. Where target values cannot be obtained through design optimization, conventional methods of manufacturing optimization are implemented. The extent to which the target values are attained and maintained over the life of the product are assessed.

15 Claims, 21 Drawing Sheets

U.S. PATENT DOCUMENTS

| | | | |
|---|---|---|---|
| 5,956,251 A | | 9/1999 | Atkinson et al. |
| 5,963,953 A | * | 10/1999 | Cram et al. .................. 707/102 |
| 5,999,908 A | * | 12/1999 | Abelow .......................... 705/1 |
| 6,253,115 B1 | * | 6/2001 | Martin et al. .................. 700/97 |
| 6,353,767 B1 | * | 3/2002 | Wakeman et al. ............. 700/91 |
| 6,377,908 B1 | * | 4/2002 | Ostrowski et al. .............. 703/2 |
| 6,405,344 B1 | * | 6/2002 | Ali et al. ........................ 716/2 |
| 6,571,202 B1 | * | 5/2003 | Loman et al. .................. 703/2 |
| 6,631,305 B2 | * | 10/2003 | Newmark ................... 700/110 |
| 6,704,015 B1 | * | 3/2004 | Bovarnick et al. ....... 345/440.2 |
| 6,725,112 B1 | * | 4/2004 | Kaminsky et al. ............ 700/97 |

OTHER PUBLICATIONS

"The identification and use of key characteristics in the product development process" by Lee et al, Proceedings of the 1996 ASME Design Engineering Technical Conferences and Computers in Engineering Conference, Aug. 1996.*

"CADET: A software support tool for constraint processes in embodiment design" by Thornton et al, Research in Engineering Design, Publisher: Springer-Verlag, 1996.*

"Modeling, Optimization and control of spatial uniformity in manufacturing processes" by Guo et al, IEEE, Feb. 1993.*

Dreze et al "A web-based methodology for product design evaluation and optimization", Oct. 1998, Journal of the Operational Research Society, vol. 40, No. 10, pp. 1034-1043.*

Web page: "About Six Sigma Qualtec", 1999 Six Sigma Qualtec, 1 p.

Web page: "Six Sigma Qualtec's History", 1999 Six Sigma Qualtec, 1 p.

Web page: "Navistar's Chatham Assembly Plant Makes 'Workplace Organization' a Priority for Staff Groups", Six Sigma Qualtec, 3 pp.

Web page: "Navistar's Truck Group Drives Change, Reaps Financial Reward", Six Sigma Qualtec, 4 pp.

Web page: "GE Capital Mortgage Canada Provides Exceptional Speed and Service Through the Use of Six Sigma Methods and Tools", Six Sigma Qualtec, 4 pp.

Web page: Six Sigma Qualtec home page, 1999 Six Sigma Qualtec, 1 p.

Web page: "Six Sigma Difference", 1999 Six Sigma Qualtec, 1 p.

Web page: "What is Six Sigma?", 1999 Six Sigma Qualtec, 1 p.

Web page: "Six Sigma Success", 1999 Six Sigma Qualtec, 2 pp.

Web page: "Six Sigma Training & Application", 1999 Six Sigma Qualtec, 2 pp.

Web page: "Leadership Symposium", 1999 Six Sigma Qualtec, 1 p.

Web page: "Lean Manufacturing", 1999 Six Sigma Qualtec, 2 pp.

Web page: "Sig Sigma Transactional", 1999 Six Sigma Qualtec, 2 pp.

* cited by examiner

BRAND PROFILER
PRODUCT ATTRIBUTE
LEADERSHIP STRATEGY

40 — 42

| ATTRIBUTE | ATTRIBUTE CLASS | PRIORITY (RANK) | PRIMARY BRAND POSITIONING | NAMEPLATE BRAND POSITIONING | PROGRAM SPECIFICS ||| PRESENT NAMEPLATE ENTRY |
|---|---|---|---|---|---|---|---|---|
| | | | | | TARGET OBJECTIVES | STATUS | | |
| USAGE EXPERIENCE | | | | | | | | |
| INTERIOR ROOMINESS | D | 1 | ⓛ A C M | ⓛ A C M | L A C M | L A C M | ⓛ A C U | |
| ERGONOMICS/FLEXIBILITY/COMFORT | D | 2 | L Ⓐ C M | ⓛ A C M | L A C M | L A C M | ⓛ A C U | |
| LUGGAGE/CARGO SPACE | D | 3 | ⓛ A C M | ⓛ A C M | L A C M | L A C M | L Ⓐ C U | |
| DURABILITY/CRAFTMANSHIP | D | 6 | L Ⓐ C M | L Ⓐ C M | L A C M | L A C M | L Ⓐ C U | |
| QUIETNESS | I | 8 | L Ⓐ C M | L Ⓐ C M | L A C M | L A C M | L Ⓐ C U | |
| EASE OF ENTRY/EXIT | I | 11 | L Ⓐ C M | L Ⓐ C M | L A C M | L A C M | L Ⓐ C U | |
| RANGE/FUEL ECONOMY | G | 15 | ⓛ A C M | L A Ⓒ M | L A C M | L A C M | L Ⓐ C U | |
| CLIMATE CONTROL | G | 17 | L Ⓐ C M | L A Ⓒ M | L A C M | L A C M | ⓛ A C U | |
| EXTERIOR VISIBILITY | G | 20 | ⓛ A C M | L A Ⓒ M | L A C M | L A C M | ⓛ A C U | |
| COST OF OWNERSHIP | G | 25 | ⓛ A C M | L Ⓐ C M | L A C M | L A C M | L Ⓐ C U | |
| DRIVING EXPERIENCE | | | | | | | | |
| PERFORMANCE/TOWING | D | 4 | L Ⓐ C M | ⓛ A C M | L A C M | L A C M | ⓛ A C U | |
| RIDE | I | 9 | L Ⓐ C M | L Ⓐ C M | L A C M | L A C M | L Ⓐ C U | |

*Fig. 4*

Critical to Satisfaction (CTS) Scorecard

Attribute: _____
Project Description: _____

Status of Items Critical to Satisfaction and Relationship to Customer

| CTS or Surrogate | Units | T.F.? Y/N | Status | | Competitor/BIC | | Target: Initial Condition | | | Target: Aged | | | Associated Cust. Sat. Improvement |
|---|---|---|---|---|---|---|---|---|---|---|---|---|---|
| | | | mean: μ | s.d.: σ | mean: μ | s.d.: σ | mean: μ | LSL | USL | mean: μ | LSL | USL | |
| *140* | *142* | *144* | *146a* | *146b* | *148a* | *148b* | *150a* | *150b* | *150c* | *152a* | *152b* | *152c* | *154* |
| | | | | | | | | | | | | | |
| | | | | | | | | | | | | | |
| | | | | | | | | | | | | | |

Fig. 10

UNDERSTAND SYSTEM $Y \rightarrow \text{FUNCTIONS} \rightarrow y$

- MODELING FUNCTION
  - FUNCTIONS VERSUS CONSTRAINTS
- FUNCTION STRUCTURES
  - ACTIVITY DIAGRAMS
  - FLOW CHAINS
  - Y-FUNCTION MATRIX
  - FUNCTION-FUNCTION MATRIX
- TECHNICAL MATRIX: y's
  - FUNCTIONAL MEASUREMENT
  - UPDATE Y-y MATRIX (QFD)

FUNCTION MAPPING $y \rightarrow f(x,n)$

- FACTORS: x's AND n's
  - AREA ANALYSIS
  - EXPLORATORY EXPERIMENTATION
  - CORRELATION
- TRANSFER FUNCTIONS
  - AREA ANALYSIS
  - REGRESSION
  - FLOW ANALYSIS
  - ANALYSIS
  - CAE TOOLS
- ESTABLISHING CRITICAL x's
  - P-DIAGRAMMING
  - CORRELATION
  - SENSITIVITY ANALYSIS

*Fig. 12b*

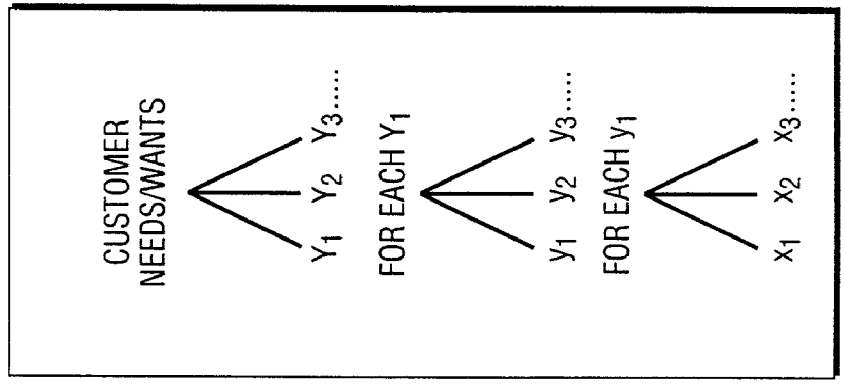

*Fig. 12a*

TRANSFER FUNCTIONS

- A QUANTITIVE RELATIONSHIP BETWEEN DEPENDENT AND INDEPENDENT VARIABLES THAT CAN BE EXPRESED AS AN EQUATION OF THE FORM $$\left.\begin{array}{c} Y = F(y_1, ...., y_n) \\ \text{OR} \\ y = f(x_1, ...., x_n) \end{array}\right\} 190$$

- ACTUAL TRANSFER FUNCTION MAY LOOK SOMETHING LIKE THIS $$\left.\begin{array}{c} Y = \alpha \sin y_1 + \beta \cos y_2 + \gamma y_3, \\ y = \beta_0 + \beta_1 x_1^{\alpha_1} + \beta_2 x_2^{\alpha_2} + \beta_3 x_3^{\alpha_3} + \lambda_1 n_1, \\ \text{etc.} \end{array}\right\} 192$$

| | A | B | C | D | E | F | G | 1 | 2 | 3 | 4 | 5 | 6 | 7 | 8 | 9 | 10 | | 1 | 2 | 3 | 4 | 5 | 6 | 7 | 8 | 9 |
|---|---|---|---|---|---|---|---|---|---|---|---|---|---|---|---|---|---|---|---|---|---|---|---|---|---|---|---|
| NOISE 1: TOTAL DESIGN/Mfg VARIABILITY Piece-to-piece variation or drawing tolerance; whichever is greater and total scope applicable | | | | | | | | | | | | | | | | | | | | | | | | | | | |
| NOISE 2: COMPONENT CHANGES OVER TIME/MILEAGE Change in dimension or change in strength over Useful Life Period (assumptions above) | | | | | | | | | | | | | | | | | | | | 1 | 2 | 3 | 4 | 5 | 6 | 7 | 8 | 9 |
| NOISE 3: DUTY CYCLE/CUSTOMER USEAGE "Typical" Customer usage over Useful Life Period (assumption above) | | | | | | | | | | | | | | | | | | | | 1 | 2 | 3 | 4 | 5 | 6 | 7 | 8 | 9 |
| NOISE 4: EXTERNAL ENVIRONMENT Climatic conditions; geographic conditions | | | | | | | | | | | | | | | | | | | | 1 | 2 | 3 | 4 | 5 | 6 | 7 | 8 | 9 |
| NOISE 5: IN VEHICLE SYSTEMS ENVIRONMENT Physical interfaces with associated systems or mating components over Useful Life Period (assumptions above) loads from or interaction with | | | | | | | | | | | | | | | | | | | | 1 | 2 | 3 | 4 | 5 | 6 | 7 | 8 | 9 |

306 — 308 — 310 — 318

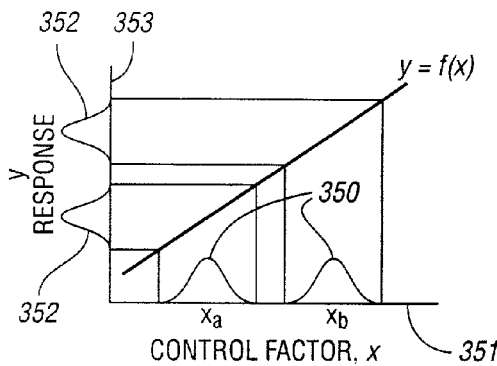

"SHIFT"
- WHEN f(x) IS LINEAR, THE NOMINAL VALUE OF THE CONTROL FACTOR x HAS NO EFFECT ON THE VARIABILITY OF THE RESPONSE, f(x).
- CHANGE THE LEVEL OF THIS CONTROL FACTOR TO SHIFT THE RESPONSE WITHOUT AFFECTING VARIABILITY.

*Fig. 19a*

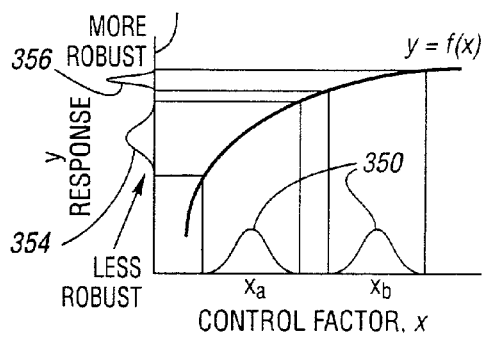

"SHRINK"
- WHEN f(x) IS NON-LINEAR, THE NOMINAL VALUE OF THE CONTROL FACTOR x CAN HAVE A MAJOR EFFECT ON THE VARIABILITY OF THE RESPONSE, f(x).
- CHANGE THE LEVEL OF THIS CONTROL FACTOR TO DESENSITIZE THE RESPONSE TO THE CONTROL FACTOR VARIABILITY.

*Fig. 19b*

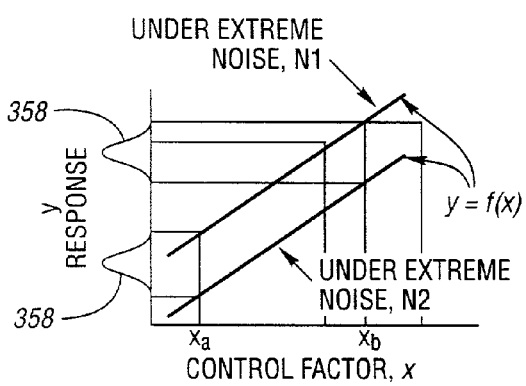

"SHIFT"
- WHEN THE CONTROL FACTOR x DOES NOT INTERACT WITH THE NOISE, THE NOMINAL VALUE OF x HAS NO EFFECT ON THE RESPONSE VARIABILITY.
- CHANGE THE LEVEL OF THIS CONTROL FACTOR TO SHIFT THE RESPONSE WITHOUT AFFECTING VARIABILITY.

*Fig. 20a*

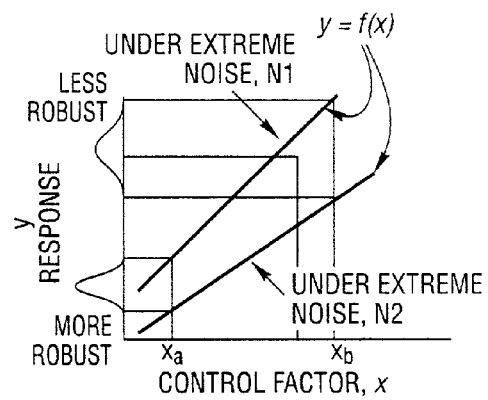

"SHRINK"
- WHEN THE CONTROL FACTOR x INTERACTS WITH THE NOISE, THE NOMINAL VALUE OF x CAN HAVE A MAJOR EFFECT ON RESPONSE VARIABILITY.
- CHANGE THE LEVEL OF THIS CONTROL FACTOR TO DESENSITIZE PERFORMANCE TO THE NOISE AND SHRINK THE RESPONSE VARIABILITY.

*Fig. 20b*

| Vehicle/Part Name: Description: | | 5.4L Engine Compression Ration Compression Ration Contribution to Engine Quietness | | |
|---|---|---|---|---|
| Performance | | Transfer Function | | |
| Characteristic | Units | Y/N | Formula (enter here) | |
| CR ~372 | Ratio ~380 | Y ~374 | y = f(x, n) ~376 | |
| | | ,382 | | |
| Variables | | Range | | Contribution |
| No. | Characteristic | Units | Min | Max | Sensitivity |
| 1 | Cyl Hd Cmbr Vol | cc | | | -0.27 |
| 2 | Blk Dk Crk/Deck Cl | mm | 255.91 | 256.04 | -0.12 |
| 3 | Head Gasket Thk | mm | 0.97 | 1.06 | -0.055 |
| 4 | | | | | |
| 5 | | | | | |
| 6 | | | | | |
| 7 | | | | | |
| 8 | | | | | |
| 9 | | | | | |
| 10 | | | | | |
| 11 | | | | | |
| 12 | | | | | |
| 13 | | | | | |
| 14 | | | | | |
| 15 | | | | | |
| 16 | | | | | |
| 17 | | | | | |
| 18 | | | | | |
| 19 | | | | | |
| 20 | | | | | |

| Cell Shading Key | |
|---|---|
| | Enter Data |
| | Do not enter data (Calculation) |

| Confidence Ratings | |
|---|---|
| High (H) | Estimate based on customer-correlated model of same parts |
| Med (M) | Estimate based on partial customer correlation or surrogate parts |
| Low (L) | Estimate without customer correlation or no process data available |

|  | Specification 378 | | Predicted Performance Capability 388 | | | |
|---|---|---|---|---|---|---|
| Target | LSL | USL | mean: μ | s.d.: σ | Short/Long | Confidence |
| 9 | 8.85 | 9.15 | 8.898125 | 0.094551 | Short | High | x's, Input Control Factors

| to Variability | Specification 384 | | Sample/Database Statistics 386 | | | |
|---|---|---|---|---|---|---|
| % | LSL | USL | mean: μ | s.d.: σ | Short/Long | Confidence |
| 99.89% | 42.45 | 45.45 | 44.36 | 0.35 | short | H |
| 0.09% | 255.875 | 256.125 | 255.924 | 0.02403 | short | H |
| 0.02% | 0.9 | 1.12 | 1.01536 | 0.02146 | short | H |
|  |  |  |  |  |  |  |
|  |  |  |  |  |  |  |
|  |  |  |  |  |  |  |
|  |  |  |  |  |  |  |
|  |  |  |  |  |  |  |
|  |  |  |  |  |  |  |
|  |  |  |  |  |  |  |
|  |  |  |  |  |  |  |
|  |  |  |  |  |  |  | n's, Input Control Factors

| | Enter Formula (must refer to cells J13, J14, ... representing $x_1$, $x_2$, ...) |
|---|---|
| | Do not enter data (Not applicable for Noise Factors) |

*Fig. 21b*

METHOD AND SYSTEM FOR PRODUCT OPTIMIZATION

CROSS-REFERENCE TO RELATED APPLICATION

This application claims the benefit of U.S. provisional application Ser. No. 60/275,498, filed Mar. 13, 2001, and entitled "Six Sigma".

BACKGROUND OF THE INVENTION

1. Field of the Invention

The present invention relates generally to six-sigma (6σ) optimization models and, more particularly, to a six-sigma model which incorporates the voice of the customer and product design into the overall optimization process.

2. Background Art

In the context of manufacturing optimization, sigma (σ) is a statistical unit of measure that reflects a level of manufacturing capability. Table 1 contains an exponential scale for quantifying manufacturing capability based on a conventional 6σ philosophy.

TABLE 1

| σ | DEFECTS PER MILLION OPPORTUNITIES (DPMO) | % SUCCESS |
|---|---|---|
| 6 | 3.4 | 99.99966 |
| 5 | 233 | 99.977 |
| 4 | 6,210 | 99.38 |
| 3 | 66,807 | 93.32 |
| 2 | 308,537 | 69.2 |

Notably, a slight increase in sigma level results in an exponential reduction in the number of defects per million manufacturing opportunities. In accord with traditional notions of 6σ manufacturing capability, a manufacturer does not attain a "best-in-class" (BIC) status until a 6σ capability level (i.e., <3.4 DPMO) is attained.

In many cases, a manufacturer's ability to transcend the 5σ level of success is hampered by the fact that 70-80% of product defects are a direct or indirect result of designed-in quality problems (i.e., problems that cannot be resolved by an increase in manufacturing capabilities alone). Accordingly, to attain a 6σ level of success, the optimization methodology should include elements of product design. Most models for 6σ optimization, however, do not incorporate the necessary design aspect of optimization. Conventional 6σ models involve the steps of measuring existing manufacturing capabilities, analyzing mechanical opportunities for decreasing variability associated with the existing manufacturing process, improving the capabilities of the manufacturing process by adopting the most cost-effective improvement opportunities, and controlling the manufacturing process to minimize variability.

Furthermore, although a few 6σ models have attempted to incorporate product design into product optimization, these models seek to enhance the robustness of product design without incorporating a detailed analysis of the voice of the customer. Although existing 6σ design optimization models including design optimization may improve product robustness, they do not analytically focus on opportunities for increasing product robustness which are most critical to customer satisfaction. Put another way, conventional 6σ design optimization models arbitrarily increase product robustness where possible without quantitatively and qualitatively weighing whether doing so will ultimately increase customer satisfaction beyond a negligible level.

SUMMARY OF THE INVENTION

One object of the present invention is to provide a method and system for product optimization which is based on an analytical methodology for translating the "voice of the customer" into aspects of the overall product that are critical to customer satisfaction (i.e., CTS aspects). This object is advantageous because it focuses optimization efforts on product aspects that, upon improvement, will yield a higher level of customer satisfaction.

Another object of the present invention is to provide a methodology for quantitatively and/or qualitatively characterizing contributing factors to each CTS aspect in terms of their design level and noise control factors (i.e., nominal design values). In accordance with a preferred embodiment of the present invention, the contributing factors (y) are characterized in terms of a transfer function $y=f(x,n)$. This object is advantageous because it translates CTS aspects into engineering/criteria that can be optimized during product design and development.

Yet another object of the present invention is to provide a system and methodology for expressing variability σy experienced in each contributing factory y based on the transfer function and nominal and variability values for each control factor x and noise factor n. This object is advantageous because it facilitates an iterative process of product design optimization wherein nominal design and variability values for control factors x are adjusted to attain target values for y and σy.

To meet these objects, features and advantages as well as additional objects, features and advantages, preferred and alternate embodiments of a method for product optimization are provided which include identifying at least one aspect of a product that is critical to customer satisfaction and a target value for at least one aspect, characterizing the at least one aspect in terms of at least one contributing factor, characterizing the at least one contributing factor in terms of at least one control factor, and adjusting nominal design values for the at least one control factor such that variability in the at least one contributing factor is minimized and the target value for the at least one aspect is attained.

The at least one contributing factor may be characterized in terms of the at least one control factor based on a transfer function $y=f(x)$. The at least one contributing factor may be additionally characterized in terms of at least one contributing noise factor and a transfer function $y=f(x,n)$.

The at least one aspect and target value for the at least one aspect may be identified based on consumer insight.

The method may further comprise identifying a target value for the at least one aspect in an aged condition, and minimizing variability in the at least one contributing factor such that the target value for the at least one aspect in the aged condition is attained.

The method may additionally comprise minimizing variability in the at least one contributing factor by reducing variability in the at least one control factor.

Variability in the at least one contributing factor may be reduced to a 6σ level.

Additionally, preferred and alternate embodiments of a computer-implemented system for facilitating product optimization are provided with include a computer system configured to receive input defining a transfer function characterizing a contributing factor to a product aspect that is critical to customer satisfaction in terms of at least one control factor for the contributing factor, to receive input defining a nominal design value and a variability value for the at least one control factor, and to output a mean and variability value for the contributing factor based on the transfer function and the nominal and variability values for the at least one control factor.

A transfer function y=f(x,n) may be implemented to characterize the contributing factor y in terms of the at least one control factor x and at least on noise factor n. The system may be additionally configured to receive input defining a nominal value and a variability value for each at least one noise factor n and output a nominal and a variability value for the contributing factor based on the transfer function, the nominal design value and variability value for the at least one control factor and the nominal value and the variability value for the at least one noise factor.

Variability in the contributing factor may be reduced in response to input adjusting the nominal design value(s) for the at least one control factor.

Variability in the contributing factor may be reduced in response to input reducing the variability value(s) for the at least one control factor.

Variability of the contributing factor may be reduced to a 6σ level.

The above objects and other objects, features, and advantages of the present invention are readily apparent from the following detailed description of the best mode for carrying out the invention when taken in connection with the accompanying drawings.

BRIEF DESCRIPTION OF THE DRAWINGS

FIG. 4 illustrates an example brand profile including a product attribute leadership strategy (PALS) in accord with the present invention;

FIG. 10 illustrates a scorecard for assessing and summarizing CTS aspects in accord with the present invention;

FIG. 12a illustrates a function map template for characterizing CTS aspects in accord with the present invention;

FIG. 12b illustrates various methodologies and tools that may be implemented in generating transfer functions in accord with the present invention;

FIG. 15 illustrates a transfer function format and example transfer function in accord with the present invention;

FIG. 17a illustrates a first portion of an R&R checklist in accord with the present invention;

FIG. 17b illustrates a second portion of an R&R checklist in accord with the present invention;

FIG. 19a is a chart demonstrating the effect of shifting a control factor x with respect to a linear transfer function y=f(x) in accord with the present invention;

FIG. 19b is a chart demonstrating the effect of shifting a control factor x with respect to a nonlinear transfer function y=f(x) in accord with the present invention;

FIG. 20a is a chart demonstrating the effect of shifting a control factor x where x is unaffected by system noises N1 and N2 in accord with the present invention;

FIG. 20b is a chart demonstrating the effect of shifting a control factor x where x is affected by noise factors N1 and N2 in accord with the present invention;

FIG. 21a illustrates a first portion of a computer-implemented scorecard for iteratively adjusting design parameters, manufacturing tolerances, and noise/control factors associated with a given transfer function in accord with the present invention;

FIG. 21b illustrates a second portion of a computer-implemented scorecard for iteratively adjusting design parameters, manufacturing tolerances, and noise/control factors associated with a given transfer function in accord with the present invention.

DETAILED DESCRIPTION OF THE PREFERRED EMBODIMENTS

Figure 1:
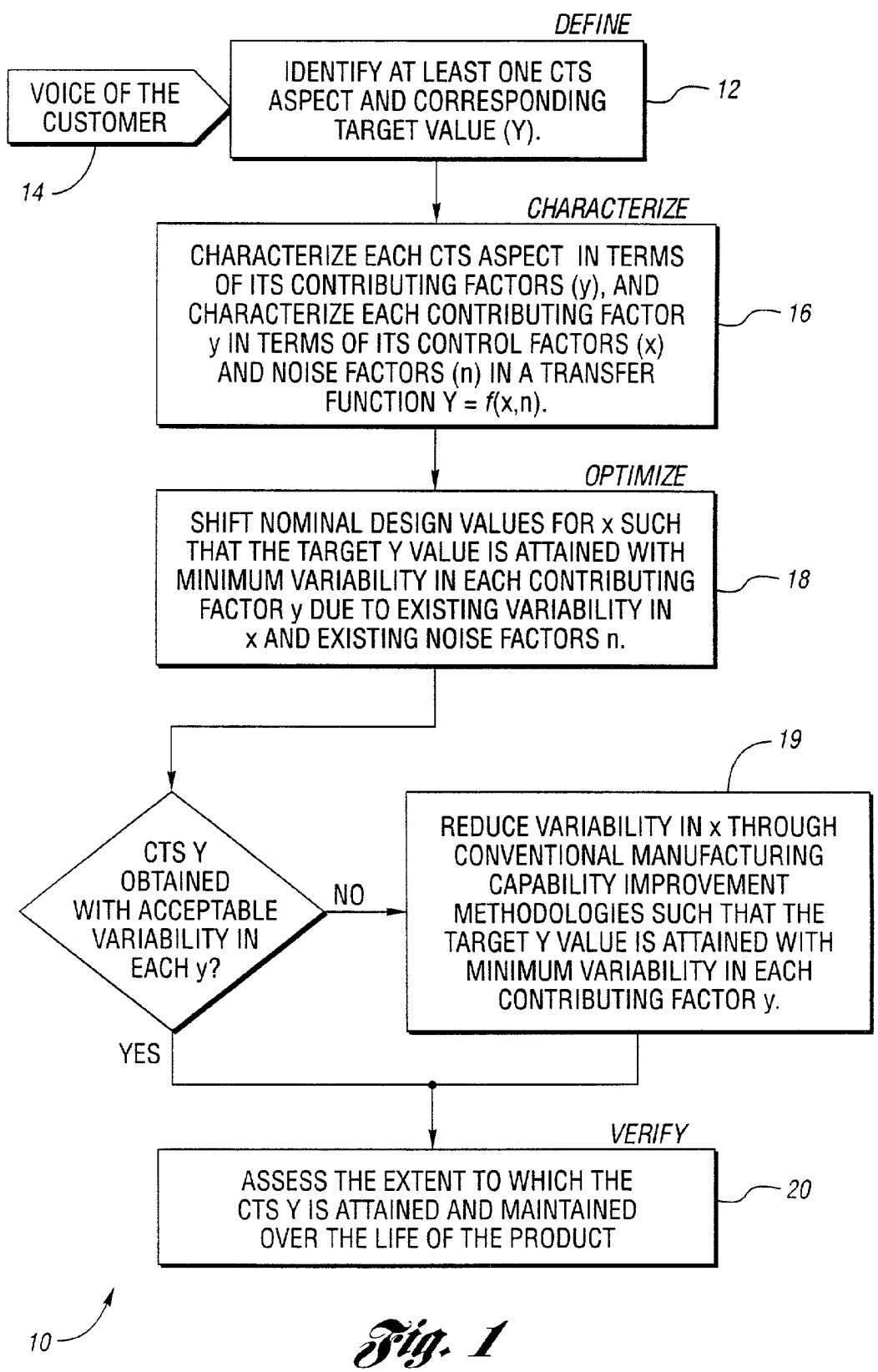
FIG. 1 is a block flow diagram illustrating an overview of a preferred method for implementing the present invention.

FIG. 1 is a block flow diagram illustrating an overview of a preferred method 10 for implementing the present invention. As represented in block 12, a "Define" aspect of the present invention identifies at least one aspect of a product that is critical to customer satisfaction (CTS) based on an analytical assessment of the "voice of the customer" 14. Preferably, the CTS aspect is reduced to a quantified value Y preferred by the customer base. "Value" Y, however, is not limited to discretely or numerically quantifiable values. Y may include qualitative descriptions, notions, or otherwise, which are identifiable forms or arrangements of CTS aspects which are based on the voice of the customer.

As represented in block 16, a "Characterize" aspect of the present invention qualitatively and/or quantitatively characterizes each CTS aspect in terms of its contributing factors (y), and characterizes each contributing factor y in terms of its significant control factors (x) and noise factors (n). In accord with a preferred embodiment of the present invention, each contributing factor y is defined in terms of a transfer function y=f(x,n).

As represented in block 18, an "Optimize" aspect of the present invention minimizes variability in each y. In accord with a preferred embodiment of the present invention, variability in each y is minimized by "shifting" nominal x values during product design to minimize the response in y caused by existing manufacturing variability and noises n.

In the event the necessary variability reduction in a particular y cannot be obtained by design optimization, conventional methodologies of manufacturing capability improvement (i.e., reduced tolerances, etc.) may be implemented to reduce variability in x. Notably, manufacturing capability improvement is often substantially more complex, time-consuming and expensive than design optimization. Accordingly, manufacturing capability improvement methods, as represented in block 19, should only be implemented as necessary after the exploitation, to the extent reasonable, of all opportunities for design optimization.

As represented in block 20, a "Verify" aspect of the present invention assesses the extent to which the CTS Y is attained and maintained over the life of the product.

For purposes of clarity and understanding, the remainder of the Detailed Description Of The Preferred Embodiments is divided into four principal sections, each corresponding to a separate aspect of the present invention (e.g., Define, Characterize, Optimize and Verify). Notably, the present invention is described in the context of the automotive industry. Such illustration, explanation and application of the present invention, however, is not so limited in practice. The objectives, advantages and means provided in accord with the present invention may be applied to a myriad of products, processes and other circumstances.

Define

The primary objectives of the Define aspect of the present invention are twofold: to identify and assess the "voice of the customer" base for a given product (i.e., to understand the customer satisfaction, needs, wants and quality history for the product) and, based on the voice of the customer base, to identify CTS aspects of the product including the associated functional targets Y for each CTS aspect.

Figure 2:
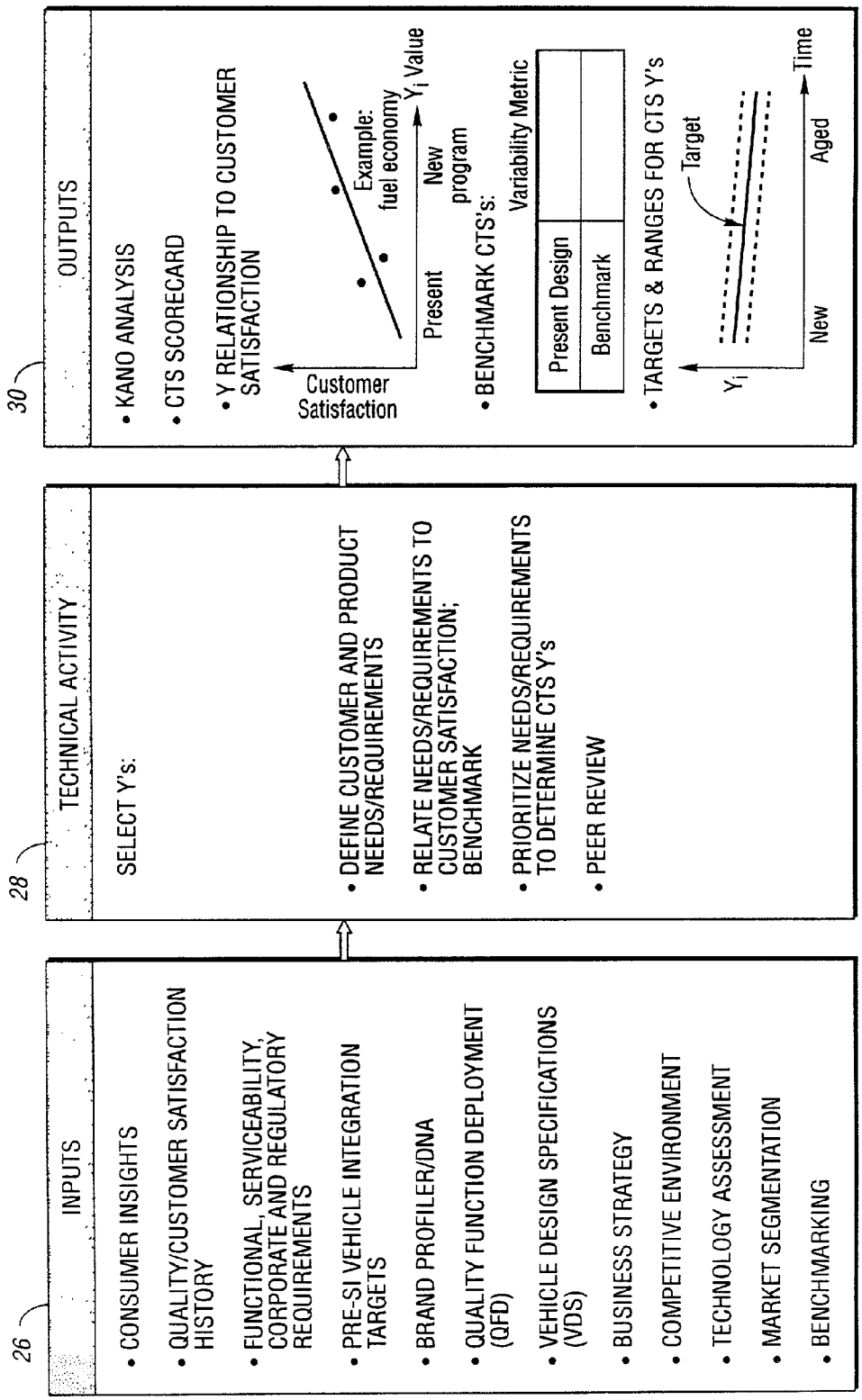
FIG. 2 is a block flow diagram illustrating an overview of the defining aspect of the present invention.

FIG. 2 is a block flow diagram illustrating an overview 24 of the Define aspect of the present invention. Inputs 26 to the Define aspect include but are not limited to: consumer insights, quality/customer satisfaction history, functional product requirements, serviceability requirements, corporate requirements, regulatory requirements, system integration targets, brand profiles, quality loss function, quality function deployment (QFD), product design specifications, business strategies, technology assessments, market segmentations and benchmarking.

Technical activity 28 associated with the Define aspect of the present invention includes defining the needs and requirements of the product and customer, relating the needs and requirements to customer satisfaction and benchmarks, prioritizing the needs and requirements to prioritize the CTS aspects of the product and peer review.

Outputs 30 of the Define aspect of the present invention include a Kano analysis and a scorecard for quantifying and/or qualifying the CTS aspects into functional target values Y. In accord with a preferred embodiment of the present invention, the Define scorecard includes a relationship between each Y and customer satisfaction, a benchmark of each Y among competitors including a best-in-class design, and acceptable targets or ranges Y for each identified CTS aspect.

Consumer insight is a primary input to the Define aspect of the present invention. In accord with a preferred embodiment of the present invention, consumer insight includes more than simply what the customer likes and dislikes in a given product. More particularly, consumer insight includes an analysis of why a consumer likes or dislikes various product aspects. In addition, consumer insight predicts features and characteristics that will surprise and delight customers. In addition to demographics, lifestyle, product preference and usage habits, consumer insight considers the psychology of the customer to identify what emotional need is so strong it will cause a consumer to act. The answer to this inquiry provides the foundation for developing a compelling brand, which in turn will attract and retain a loyal customer.

Methods for acquiring consumer insight involve the use of certain tools including but not limited to interviews, verbatims, observation, immersion (i.e., "stepping" into another's life for a sufficient time to gain insight), and introspection (i.e., imagining yourself in the role of the consumer). Open-ended questions for eliciting consumer feedback regarding products and services includes but is not limited to:

What images come to mind when you visualize this product or service?

What complaints, problems or weaknesses would you like to mention about the product or service?

What features do you think of when selecting the product or service?

What new features might address your future needs?

Organizing consumer insight data in a useful manner in accord with the present invention involves a variety of tools including but not limited to: a brand bull's eye, a brand profiler, a product attribute leadership strategy (PALS), a global quality research system (GQRS), product benchmarking, a gap analysis, a Kano analysis, a target-setting/tradeoff analysis, a quality function deployment (QFD) analysis, and a CTS scorecard.

Figure 3:
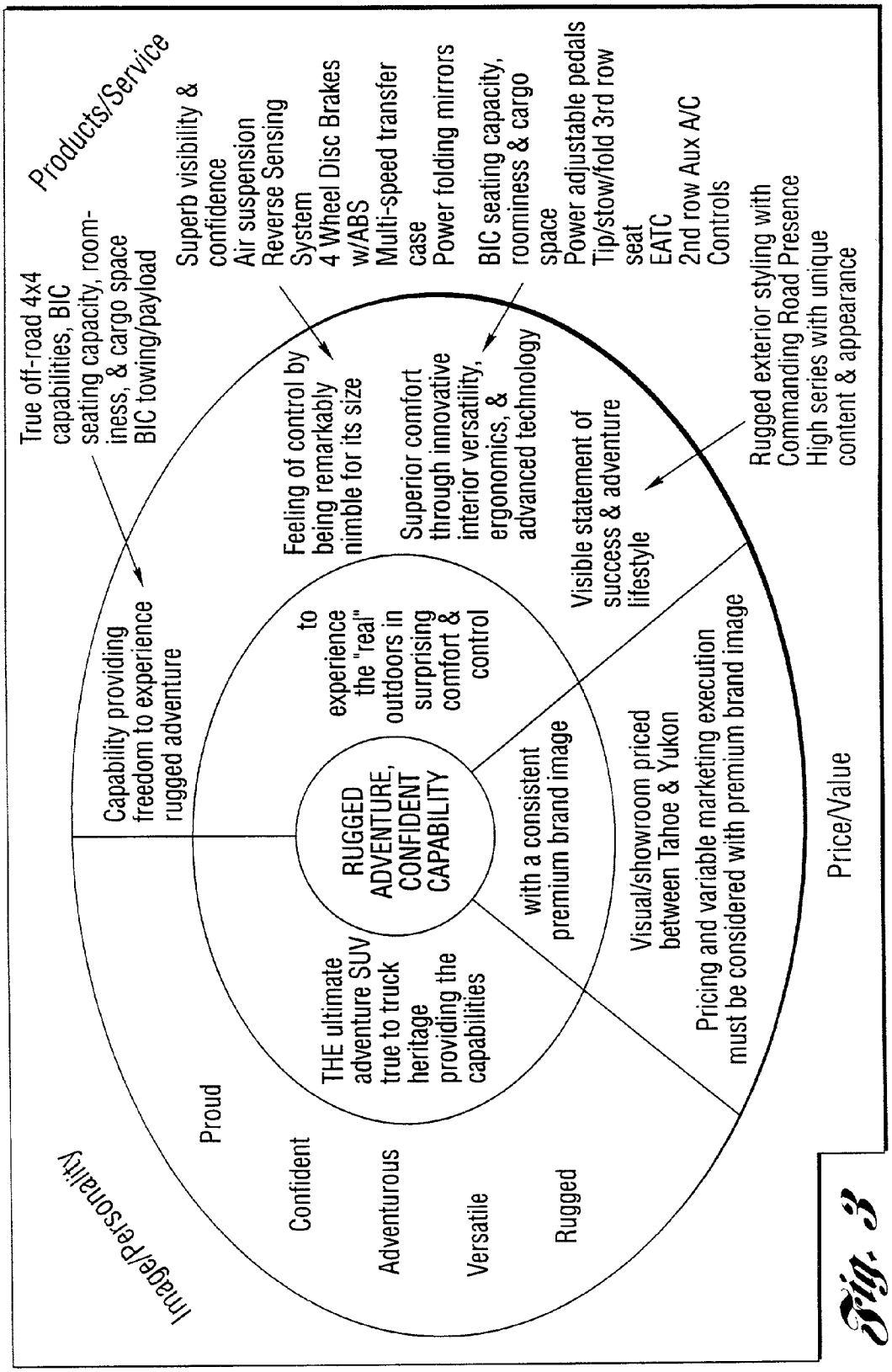
FIG. 3 illustrates an example brand bull's eye for organizing consumer insight in accord with the present invention.

FIG. 3 illustrates an example brand bull's eye for organizing consumer insight pertaining to characteristics of a particular product (e.g., automobile). The brand bull's eye helps product development teams to define the vision of their brand at a high or abstracted qualitative and/or quantitative level in terms of image/personality, product/service and price/value.

FIG. 4 illustrates an example brand profiler including "Product Attribute Leadership Strategy" (PALS) corresponding to the example brand bull's eye illustrated in FIG. 3. The PALS translates the high-level bull's eye characteristics into actual product attributes upon which designers and engineers can take action. Another function of the PALS is to identify which product aspects or attributes differentiate the product from the competition. Table 2 contains an example listing of attribute class values 40 and corresponding definitions in accord with the present invention.

TABLE 2

| Label | Name | Definition |
| --- | --- | --- |
| D | Differentiator | Attributes that are extremely important to differentiate the brand from competition. The Differentiator is the basis on which the brand's personality is built. |
| I | Important Brand Benefit | Attributes that are an important part of the brand's personality, but do not differentiate the product. |

TABLE 2-continued

| Label | Name | Definition |
|---|---|---|
| G | Given | Attributes whose priorities are determined by the cost of entry. Improvements are not critical to support the brand's personality. |
| NA | Not Applicable | These attributes are not applicable to this brand or product type. |

Table 3 contains an example qualification listing for product attribute leadership values 42 in accord with the present invention.

TABLE 3

| Label | Name | Definition |
|---|---|---|
| L | Leadership | Attributes that should set the brand apart from other vehicles within the competitive set; basis upon which the brand's personality is built. |
| A | Among The Leaders | Attributes for which the brand must be as good as the best in the competitive set to support its positioning. |
| C | Competitive | Attributes for which the brand must be in line with the competitive set; but are not critical to the brand's personality. |
| M | Minimal Investment | Attributes that are not relevant to support the brand; if required at all, should be met at the lowest possible cost. |
| U | Uncompetitive | Uncompetitive attribute. |

Figure 5:
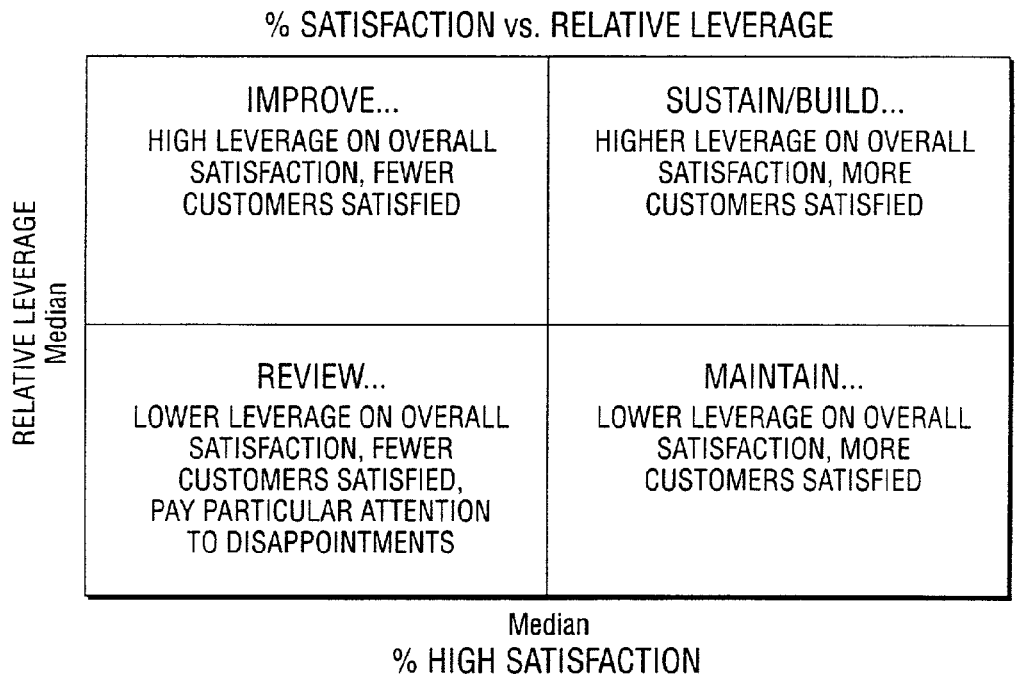
FIG. 5 is a quadrant chart for relating percent high customer satisfaction with relative leverage in accord with the present invention.

Sources of customer satisfaction and quality history data include but are not limited to satisfaction and market data, media ratings (e.g., JD Power, Consumer Reports, etc.), market research, historical warranty and recall data and benchmarking. Another source of customer satisfaction is a global quality research system (GQRS). The GQRS includes retail customer-based evaluations through which customers identify and define their own perceptions of vehicle quality including "things gone wrong" ("TGW"), satisfaction, expectations and verbatim statements. Other metrics which may be derived from the GQRS include inhibitors of customer satisfaction and relative leverages. Relative leverage is a measure of the strength of the relationship between an individual satisfaction attribute and the satisfaction with overall product ownership experience. FIG. 5 is a quadrant chart for relating Percent High Customer Satisfaction with Relative Leverage in accord with the present invention.

Figure 6:
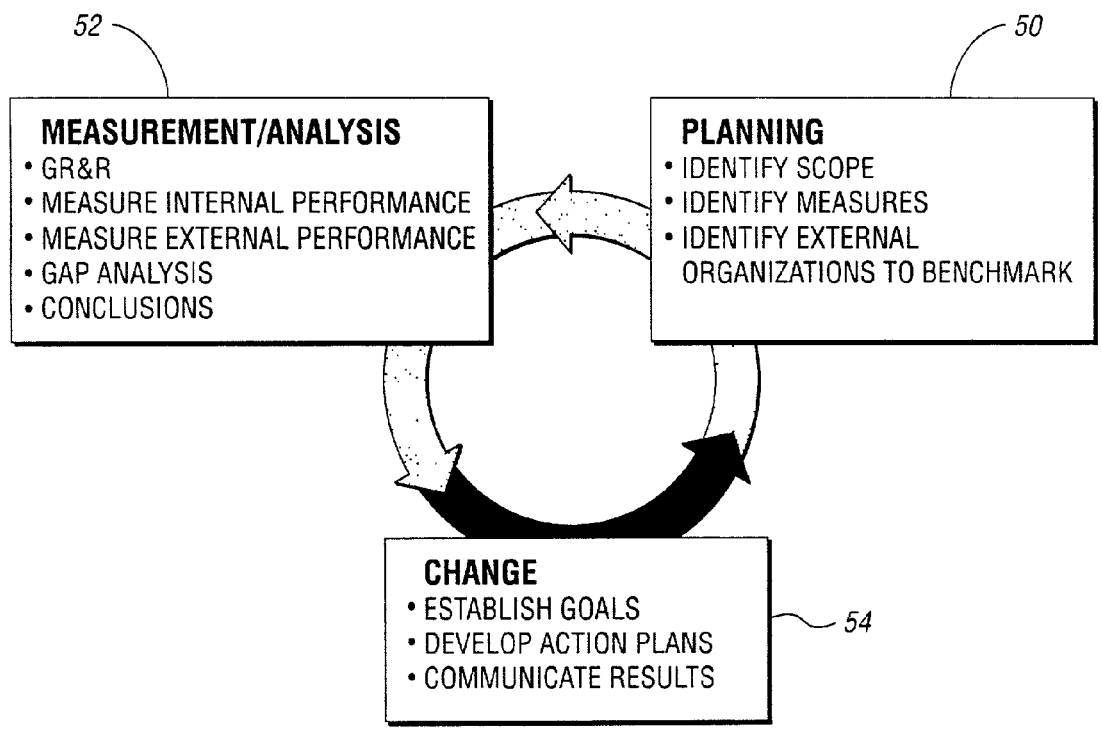
FIG. 6 is a block flow diagram illustrating an overview product benchmarking in accord with the present invention.

FIG. 6 is a block flow diagram illustrating an overview of product benchmarking in accord with the Define aspect of the present invention. Product benchmarking in accord with the present invention includes three iterative primary elements: planning 50, measurement/analysis 52 and change 54.

Figure 7:
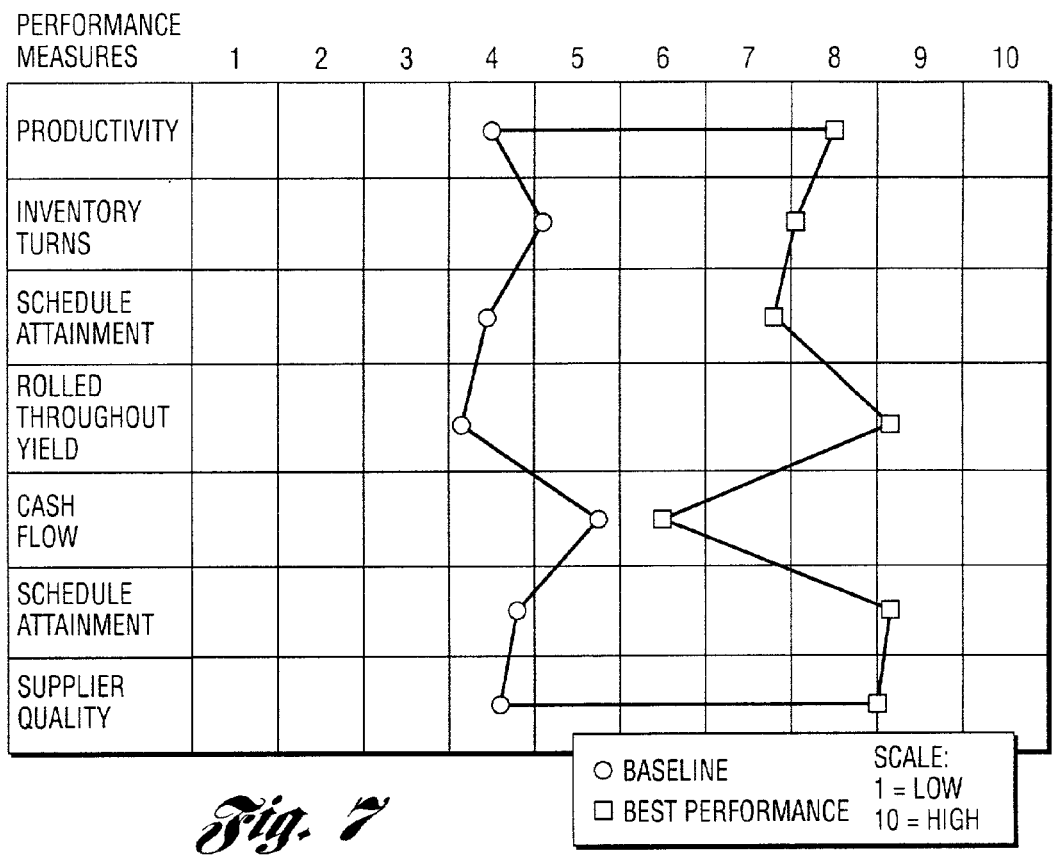
FIG. 7 illustrates a gap analysis associated with product benchmarking in accord with the present invention.

FIG. 7 illustrates a gap analysis in accord with the measurement/analysis aspect of product benchmarking. As illustrated, the gap analysis graphically identifies discrepancies between baseline and best practices for a plurality of product performance measures.

The change aspect 54 of product benchmarking involves developing action plans that revisit the purpose of the benchmarking study, review the baseline product assessment, review external product performance metrics, and, based on compiled data, make recommendations to close some or all of the identified gaps.

Figure 8:
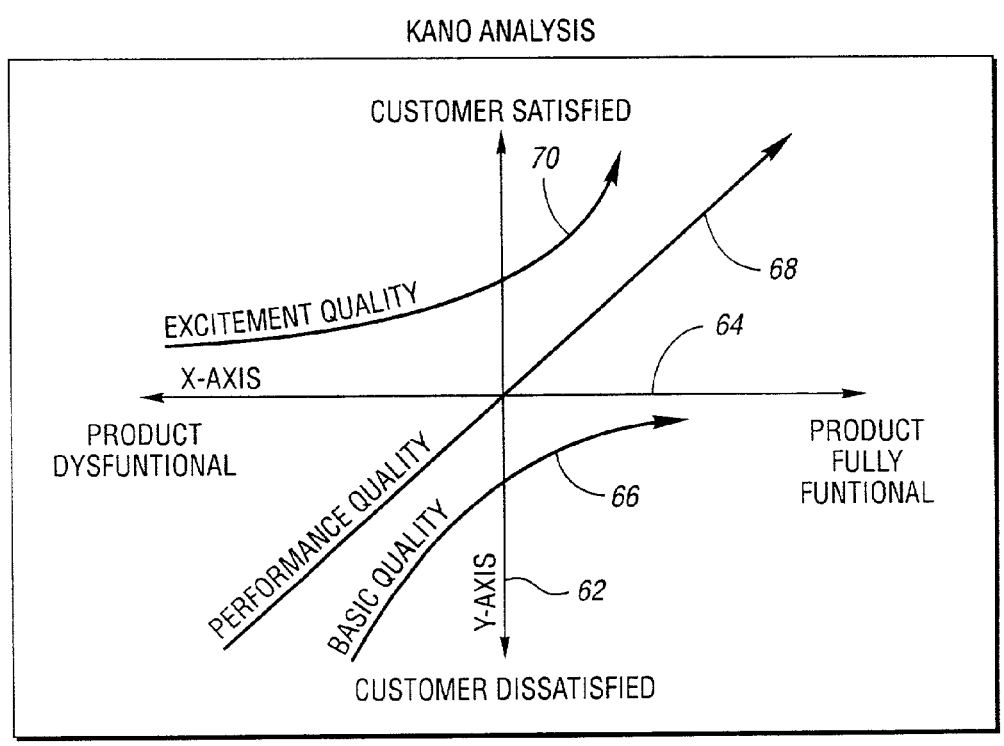
FIG. 8 illustrates a Kano analysis for analyzing data collected in accord with the defined aspect of the present invention.

FIG. 8 illustrates a Kano analysis 60 for analyzing data collected in accord with the Define aspect of the present invention. The primary objective of the Kano analysis is to identify the benefits and limitations of different options for improving customer satisfaction. In addition, the analysis organizes and prioritizes the CTS aspects of the overall product. Ultimately, the Kano analysis provides a template for planning, executing and assessing the progress of overall product quality improvement. The Y-axis 62 of the Kano analysis represents the relative degree of customer satisfaction corresponding to each product attribute that is plotted. The X-axis 64 provides an indication as to how well the desired function of the CTS product aspects has been achieved.

Notably, the Kano model identifies three primary regions of quality, each exhibiting a different effect on customer satisfaction. Curve 66 represents a threshold of basic product quality. Basic product quality curve 66 delineates aspects of the overall product that the customer only "notices" when the aspects are missing or malfunctioning. In other words, the customer is not more satisfied when these aspects perform well and optimizing these items will not raise customer satisfaction beyond a certain limit. For example, aspects of basic quality pertaining to an automobile may include trim defects, squeaks and rattles, engine malfunctions and transmission faults. Data sources for identifying basic quality product aspects include the GQRS (i.e., things gone wrong ("TGW")) and warranty, campaign (recall) repair and defect data.

Performance quality curve 68 delineates aspects of the overall product that increase customer satisfaction the better they perform and decrease customer satisfaction the worse they perform. In accord with the automotive example, performance quality aspects may include fuel economy, power and pickup, shift quality and wind noise. Data sources for identifying performance quality product aspects include the GQRS (i.e., aspects with a high satisfaction leverage), attribute targets, field and benchmarking data, consumer interviews, and PALS aspects which are designated "Lead" or "Among the Leaders".

Excitement quality curve 70 delineates aspects of the overall product that increase customer satisfaction when the aspect is more functional, but do not decrease customer satisfaction when the aspect is less functional (i.e., surprises and delights). In accord with the automotive example, excitement quality attributes may include improvement of existing function, new features, technological advances, etc. Data sources for identifying excitement quality aspects include the GQRS (i.e., items with a high percentage better than expected and customer verbatims), customer insight/ observation (i.e., retail, fleet and enthusiasts), technology futuring, and PALS aspects which are designated "Lead".

Notably, excitement quality product attributes may vary over time. For example, aspects that are initially a "surprise and delight" to a customer may turn into product expectations over time (e.g., cup holders, new technology, "gadgets", etc.). Accordingly, developing "surprises and delights" requires activities to gain insight into customer's emotions and motivations, including observational activities that identify latent customer needs. Excitement quality is also driven by "superlative execution" of the product aspects that drive the overall product brand. Accordingly, a robust product design that minimizes degradation of these attributes over time is important to maintaining excitement quality. In addition, a robust design of a product aspect that preserves basic quality substantially beyond customer expectations may become an excitement quality aspect over time based on outstanding reliability and durability.

Figure 9:
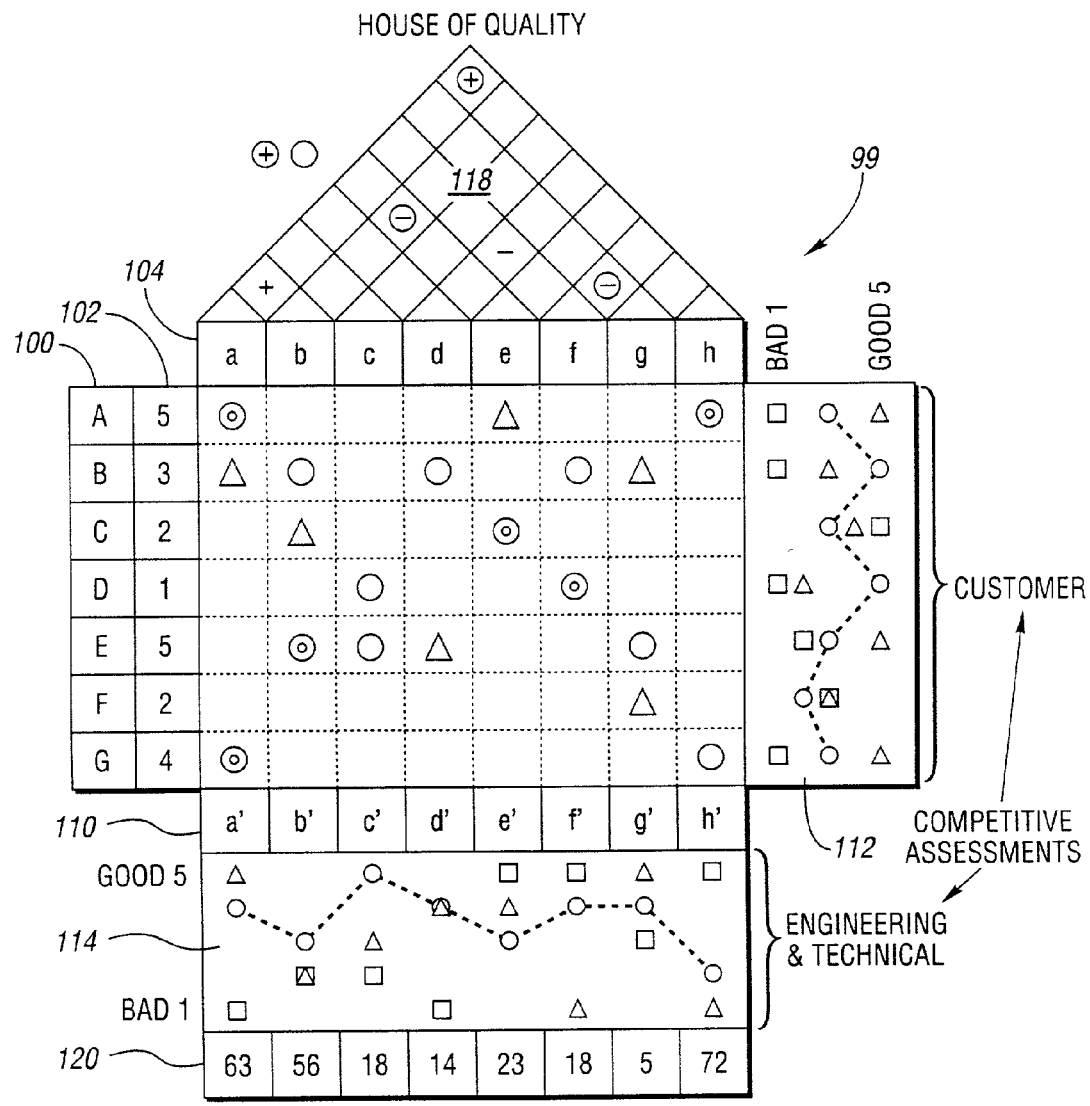
FIG. 9 illustrates schematic diagram (i.e., "house of quality") for organizing QFD data in accord with the present invention.

FIG. 9 illustrates a schematic diagram (i.e., "House of Quality") 99 for organizing QFD data. Column 100 contains CTS product aspects. Column 102 contains a prioritization of CTS aspects 100 based on a performance rating scale of 0 to 5 (derived from consumer surveys and other market data). Row 104 contains functional product requirements expressed as engineering criteria. In accord with the automotive example, "good ride" may be defined by engineering criteria such as dampening, anti-roll and stability. Relationship matrix 106 graphically and quantitatively reflects the degree of relationship between CTS product aspects 100 and engineering criteria 104 according to the relationship matrix key 108 where the value 9 reflects a high degree of relationship and the value 1 reflects a low degree of relationship.

Row 110 contains target design values corresponding to each of the engineering and design criteria contained in row 104. Competitive assessment 112 graphically reflects a comparison, based on consumer data, between current CTS product aspects 100 and the same or similar aspects of competitors' products. Similarly, competitive assessment 114 graphically reflects a comparison, based on engineering and technical data, between current engineering and design criteria 104 and the same or similar criteria of competitors' products.

Correlation matrix 118 facilitates tradeoff decisions by correlating between various engineering criteria 104 and qualifying the level of correlation (i.e., the relative impact each metric has on the other).

Technical importance ratings contained in row 120 are derived for each engineering/design criteria 104 based on the cumulative sum of the products of the relevant customer importance ratings 102 and the relevant relationship matrix values 106. For example, the technical importance rating for engineering/design criteria "a" is calculated as follows: $(5 \times 9)+(4 \times 9)=63$. Similarly, the technical importance rating for engineering/design criteria "d" is calculated as follows: $(3 \times 3)+(5 \times 1)=14$.

Notably, the House of Quality 99 may be rearranged, modified or adapted within the scope of the present invention to best fit the particular circumstances unique to any QFD analysis. In addition, not all aspects of the House of Quality 99 are required for an effective QFD analysis. The necessary elements depend uniquely upon the circumstances of each QFD analysis.

FIG. 10 illustrates a scorecard for assessing and summarizing the CTS aspects of an overall product that are identified in accord with the Define aspect of the present invention. CTS or surrogate field 140 denotes the aspects of the overall product that are most critical to customer satisfaction. Units field 142 denotes the unit of measure for the CTS aspect. "T.F. Y/N" field 144 denotes whether a transfer function (T/F) for the corresponding CTS aspect is currently known. Transfer functions are discussed in more detail with respect to the Characterize and Optimize aspect of the present invention.

Status fields 145 denote the current mean (a) 146a and variability (σy) 146b for the CTS aspect. Competitor/Best-in-Class (BIC) fields 148 denote a competitive benchmark of the mean 148a and variability 148b values for the corresponding CTS aspect 140.

Target Initial Condition fields 150 denote the target mean 150a (i.e., Y value), lower specification limit (LSL) 150b and upper specification limit (US) 150c values for the CTS aspect shortly after manufacture or assembly of the overall product. Target aged condition fields 152 denote the target mean 152a, LSL 152b and US 152c values for the CTS aspect in an aged condition.

"Associated Customer Satisfaction Improvement" field 154 denotes an expected level of improvement in customer satisfaction as a result of attaining the target CTS aspect values denoted in fields 150 and 152.

Characterize

The primary objectives of the Characterize aspect of the present invention are threefold: to break down each CTS aspect into its contributing factors (y); to characterize each y in terms of its significant control factors (x) and noise factors (n); and to develop a transfer function $y=f(x,n)$ which quantitatively and/or qualitatively relates CTS contributing factors y with their respective control factors x and noise factors n.

Table 4 contains nomenclature and corresponding descriptions utilized in accord with the present invention.

TABLE 4

| Symbol | Description |
|---|---|
| Y | Customer Need/Want that is critical to Satisfaction (CTS). If not expressible as a measurable technical metric, can be represented by surrogate measures that are. |
| y | Measurable quantity that is critical to achieving Y. Not directly specifiable by an engineer. |
| x | Measurable quantity that is critical to achieving y. Can be specified by an engineer in the product or process design, e.g., part and process characteristics "Control Factor." |
| n | Measurable quantity that affects y Cannot be specified by an engineer "Noise Factor." |

Figure 11:
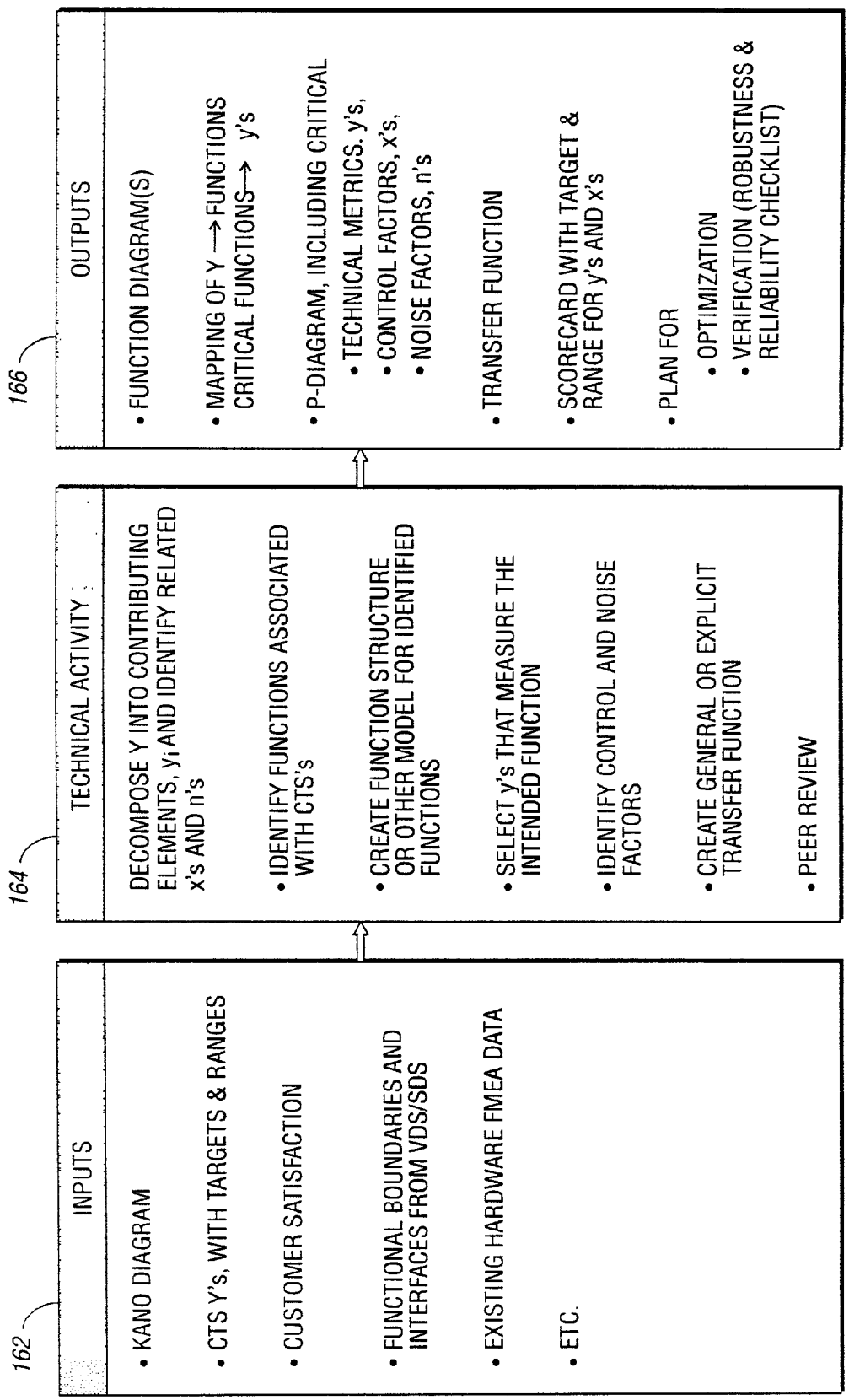
FIG. 11 is a block flow diagram illustrating an overview of the characterized aspect of the present invention.

FIG. 11 is a block flow diagram illustrating an overview 160 of the Characterize aspect of the present invention. Inputs 162 include but are not limited to: the Kano diagram, the CTS aspects including target and target range values (i.e., Y's) for corresponding engineering/design criteria derived from the QFD as (illustrated in FIG. 9), the CTS scorecard (illustrated in FIG. 10), functional system boundaries and interfaces, and existing process and hardware failure mode and effects analysis (FLEA/PFMEA) data.

Technical activity 164 associated with the Characterize aspect of the present invention includes decomposing each CTS Y into its contributing factors y, and further decomposing each y into its contributing control factors x and n noise factors. Additional activities associated with the Characterize aspect of the present invention include generating a quantitative and/or qualitative function structure to create a general or explicit transfer function $y=f(x,n)$ and peer review.

Outputs 166 of the Characterize aspect of the present invention include function diagrams, a graphical map correlating $Y_i$, $y_i$, $x_i$ and $n_i$ values, a transfer function for each $y_i$, a scorecard with target and range values for each $y_i$ and $x_i$, and a preliminary plan for the Optimization and Verify aspects of the present invention.

FIG. 12a illustrates a function map template for characterizing CTS aspects in accord with the present invention. FIG. 12b illustrates various methodologies and tools that may be implemented to understand the product or system at issue and to generate the corresponding transfer function y=f(x,n).

In accord with a preferred embodiment of the present invention, function modeling provides the starting point for the systematic relational characterization of $Y_i$, $y_i$, $x_i$ and $n_i$ values. In more complex systems, the modeling function helps to identify and quantify/qualify the CTS aspects of a product as well as the applicable transfer function(s). Generally, the function model is a form-independent statement of what a product or statement does. Modeling functions are usually expressed as a verb-noun pair or as an active verb-noun phrase pair. General examples include "transmit energy", "import material" and "indicate state". More specific examples include "transmit torque", "import hand" and "indicate temperature".

An overall function model is a statement of what the entire product, system or process does. A subfunction is a component function which is combined with other subfunctions to create the overall product function. For example, the overall function of a coffee cup is to "hold coffee". Subfunctions include "contain liquid", "insulate air", "support liquid", "accept pour", "interface hand" and "pour liquid". Notably, some CTS product aspects deal with metrics that do not define function (or subfunction) directly (e.g., cost, reliability, weight, appearance, productability, environmental impact, etc.).

In accord with conventional notions of function modeling, constraints are properties of a product or system, but not something the product or system does. Typically, all elements in a given product or system contribute to a constraint—not just one element. In addition, constraints can be modeled with metrics over the function model or over the bill of materials.

Figure 13:
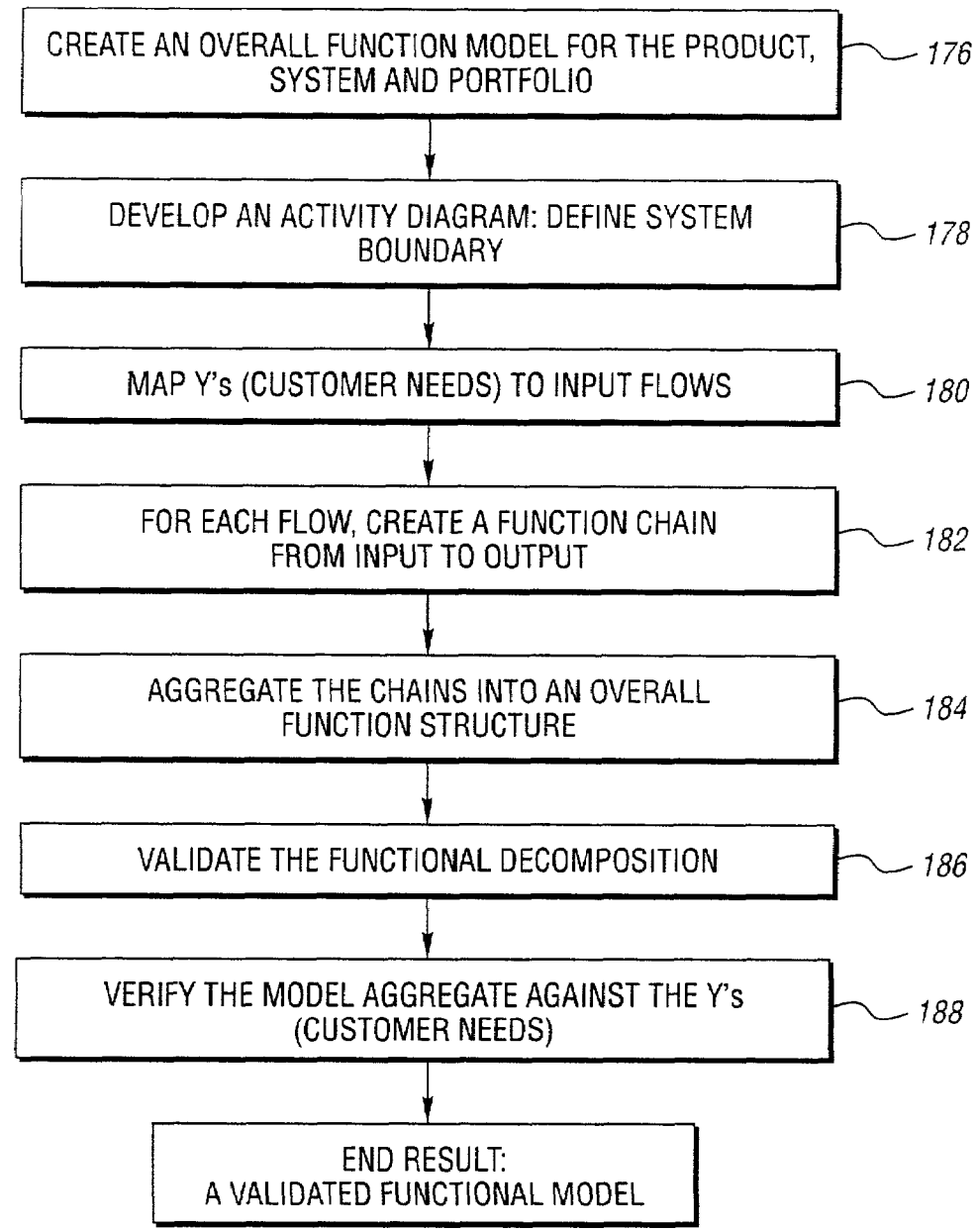
FIG. 13 is a block flow diagram illustrating a preferred method for creating a function structure in accord with the present invention.

A function structure is used to validate a functional model. FIG. 13 is a block flow diagram illustrating a preferred method for creating a function structure 174 in accord with the present invention.

First, an overall function model for the product, system or portfolio is created, as represented in block 176. Next, an activity diagram is developed which includes a system boundary and user activities as represented in block 178. Next, CTS aspects are mapped to input flows as represented in block 180. For each input flow, a function chain is created from input to output as represented in block 182. As represented in block 184, each function chain is aggregated into an overall function structure. Next, the functional decomposition of the functional structure is validated as represented in block 186. Last, the overall function model is verified against each CTS aspect, as represented in block 188.

Identifying technical metrics or engineering/design criteria in accord with the present invention comprises a three-tiered process. First, each critical product or system function designated in the QFD is measured to quantify the function as a "y". Next, interfaces between each critical function designated in the QFD are measured to quantify the conflict/reinforcement as a "y". Last, all possible "y's" are rolled into an effective set of "y's".

Figure 14:
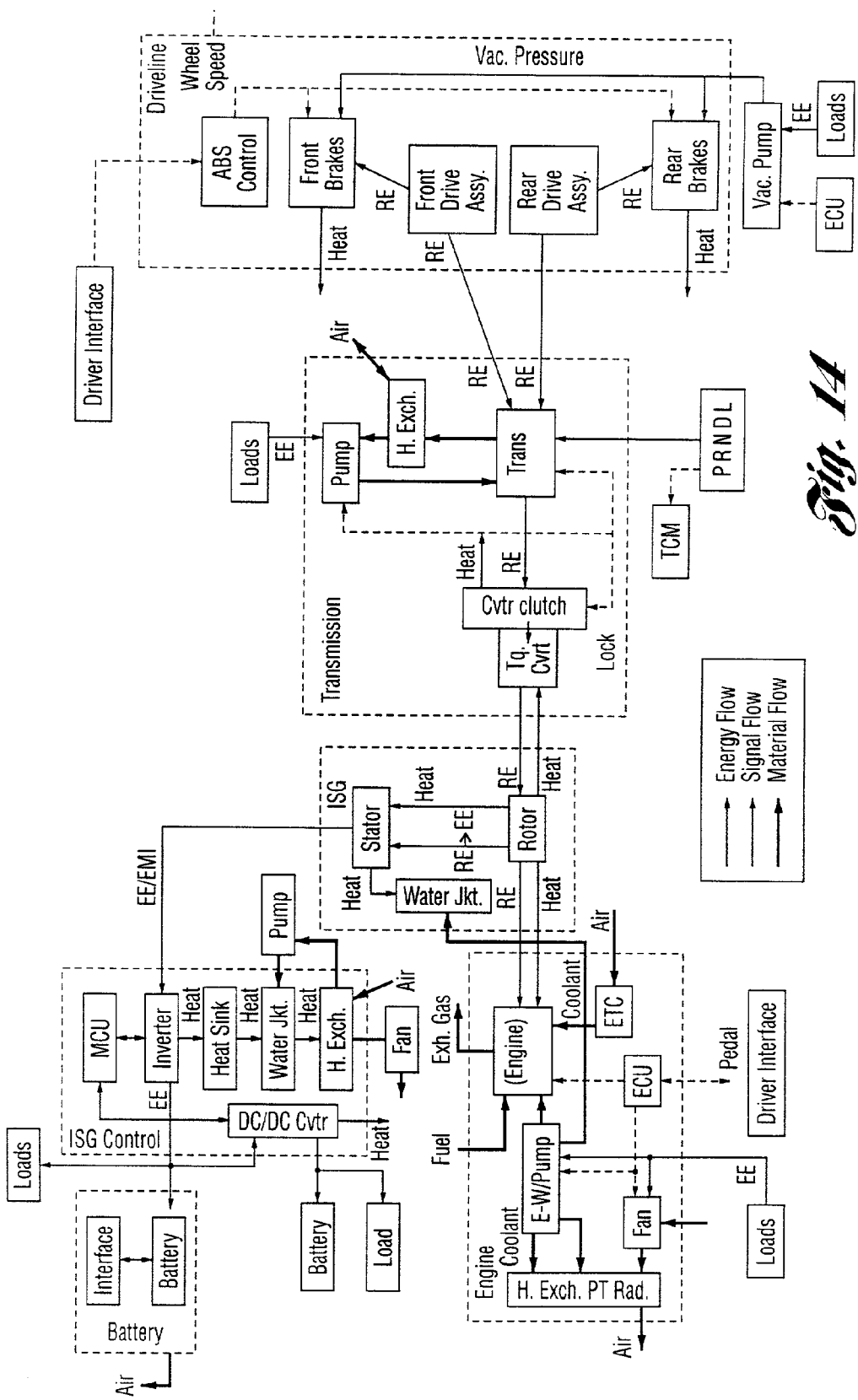
FIG. 14 illustrates an example geometric function structure for an automotive regenerative braking system in accord with the present invention.

To measure each critical system function, the function model is analyzed to determine what value can be measured to quantify the transformed function flow from input to output. The results of this inquiry are potential "y's". This approach to measuring system functions provides the input-output relationship explicitly in a metric-based manner. Preferably, system functions are laid out geometrically so that separate functions are contained within separate regions. FIG. 14 illustrates an example geometric function structure for an automotive regenerative braking system containing a variety of separate functions each having inputs, transformations and outputs.

For each system interface having a high level of interactivity, three inquiries are made: the level of flow between the two functions, the problem/benefit associated with the flow, and what can be measured to quantify this flow problem/benefit. In accord with the coffee example, the flow between "contain coffee" and "guide pour" is "coffee". This coffee flow causes a benefit/problem because the "guide pour" function must provide an opening that is disadvantageous to "contain coffee". The focus of the difficulty/benefit interaction in this case is the sloshing of coffee during pour-out. Accordingly, measurable values constituting potential "y" values include the amount of slosh from side force impact during pour and the amount of spill during a 15E pour from a full cup.

Preferably, the QFD is updated to include any new "y" values (i.e., engineering/design metrics or criteria contained in FIG. 9, row 104). In addition, the CTS scorecard illustrated in FIG. 10 is updated to include any additional "y" values identified throughout the Characterize and Optimize aspects of the present invention.

The function mapping aspect of the present invention involves identifying the control and noise factors, x and n respectively, contributing to each y. To identify x values, function input variables are examined to determine which variables can be readily specified by design or manufacturing teams. Any variables that can be controlled are considered control factors x. Any variables that cannot be controlled are considered noise factors n.

FIG. 15 illustrates transfer function format 190 and example transfer functions 192 for quantitatively interrelating $Y_i$, $y_i$, $x_i$ and $n_i$ values in accord with the present invention. The primary purpose of the transfer function is to estimate both the mean and variance of CTS product aspects (i.e., Y values) as well as their contributing elements y. Ultimately, the transfer function is utilized to determine for what values of the independent variable the dependent variable is a maximum, minimum, or specified value with minimum variability.

Transfer functions may be derived based on a wide variety of information ranging from engineering "first principles" to more empirical data. For example, one source of transfer functions includes technical drawings of components and systems. Commonly, such drawings are useful to determining product variation stack-up based upon tolerances and geometry. Another source of transfer functions includes physical equations that describe function (e.g., V=IR, f=ma, etc.). A third source of transfer functions includes finite element and other virtual product models. Generally, such models are derived from first principles but are not expressible in a single closed-form transfer function. A fourth source of transfer functions includes designed experiments based on models, prototypes, or representative hardware. Yet another source of transfer functions is a correlation/regression analysis based on product, manufacturing, or service performance data.

In some circumstances, a CTS product aspect cannot be expressed through an explicit transfer function. In this case, a set of metrics is identified that can serve as a surrogate for Y. Additional data is generally required in this situation to verify the relationship between Y and the surrogate metrics.

Notably, not all x and n factors should be included in the overall transfer function. Preferably, only the x and n factors that are most critical for achieving y are included. For example, only a few (i.e., two or three) x factors may contribute to 80% of the variation in a given y. While over thirty x factors may contribute to the remaining 20% of the variation in y. Preferably, in this case, the transfer function includes the few x values that contribute to 80% of the variation in y.

Characterizing opportunities for increasing product robustness in accord with the Characterize aspect of the present invention also involves the implementation of a Pugh methodology for identifying, defining and prioritizing favorable design improvements. The Pugh methodology is advantageous because it facilitates concept generation in a structural manner and typically produces a multitude of concepts that must be objectively evaluated. In addition, the methodology improves original concepts, generates hybrid concepts, and increases the efficiency of development time and money. Due to its structural nature, the Pugh methodology iteratively focuses the design team on a defined set of alternatives, and prevents the team from prematurely jumping to a single solution that undergoes frequent engineering changes. In addition, the Pugh methodology increases the understanding the engineering and design teams have of overall product design.

In general, the Pugh methodology evaluates design concepts against design criteria at a relatively low resolution. The method employs an iterative process of design alternative selection and enhancement to "converge" on the best overall architecture. Table 5 contains a generic Pugh analysis in accord with the present invention.

TABLE 5

| Selection Criteria | Alternative System Configurations | | | | | |
|---|---|---|---|---|---|---|
| | A | B | C | D | C2 | BC |
| Criteria 1 | S | + | − | + | + | S |
| Criteria 2 | + | S | S | S | + | S |
| Criteria 3 | S | S | + | − | + | + |
| Criteria 4 | − | + | + | − | + | + |
| Criteria 5 | S | − | + | − | − | + |
| Criteria 6 | − | − | S | − | + | S |
| Criteria 7 | − | S | S | + | S | + |
| Criteria 8 | + | − | + | S | + | S |
| Criteria 9 | + | − | − | − | S | − |
| Criteria 10 | S | + | + | + | + | + |
| Criteria 11 | − | + | + | S | + | + |
| Σy+ | 3 | 4 | 6 | 3 | 8 | 6 |
| Σy− | 4 | 4 | 2 | 5 | 1 | 1 |
| ΣS | 4 | 3 | 3 | 3 | 2 | 4 |

To begin the Pugh analysis, a design concept (not shown) is selected as a reference against which all potential design alternatives will be compared. Each alternate design concept (i.e., A, B, C, etc.) or hybrid concept (i.e., BC) is then evaluated and benchmarked against the reference design based on the expected performance of the alternative. For each design alternative, a design criteria that is expected to perform better than the reference design is denoted with a "+". Criteria that are expected to perform worse than the reference design were denoted with a "−". Design criteria that are expected to perform the same as the reference design are noted with an "S". When all design alternatives and corresponding criteria have been benchmarked, the respective number of "+'s", "−'s" and "S's" are summed. In a single round of analysis, the winning concept is the one with the fewest "−'s". In the case of a tie, the winning concept is the one with the most "+'s" in addition to the fewest "−'s". Because the Pugh methodology is an iterative process, alternate potential concepts may be improved or refined to eliminate "−'s".

Figure 16:
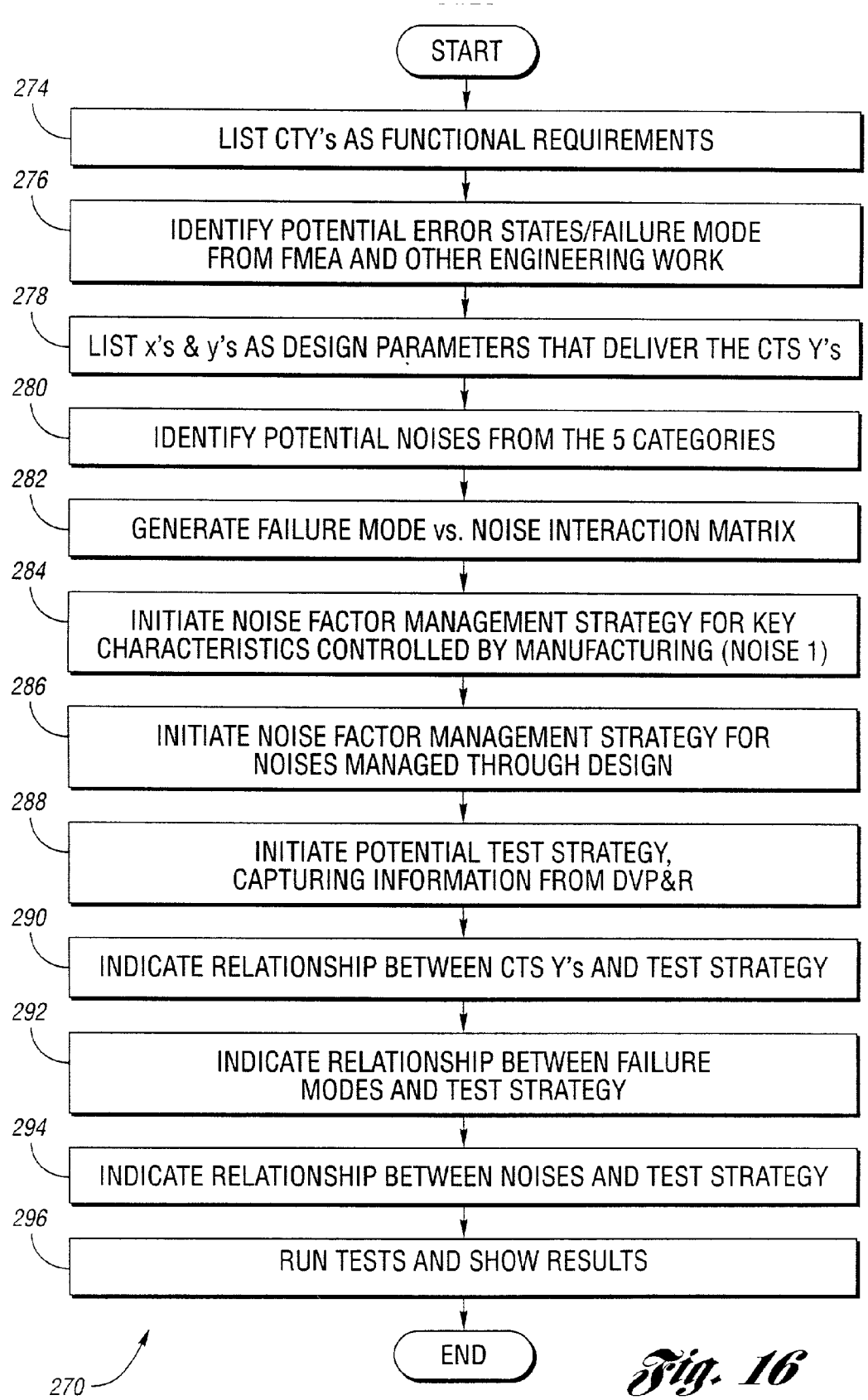
FIG. 16 is a block flow diagram illustrating a methodology for developing a plan to attain and maintain a level of reliability and robustness (R&R) in accord with the present invention.
Figure 17A:
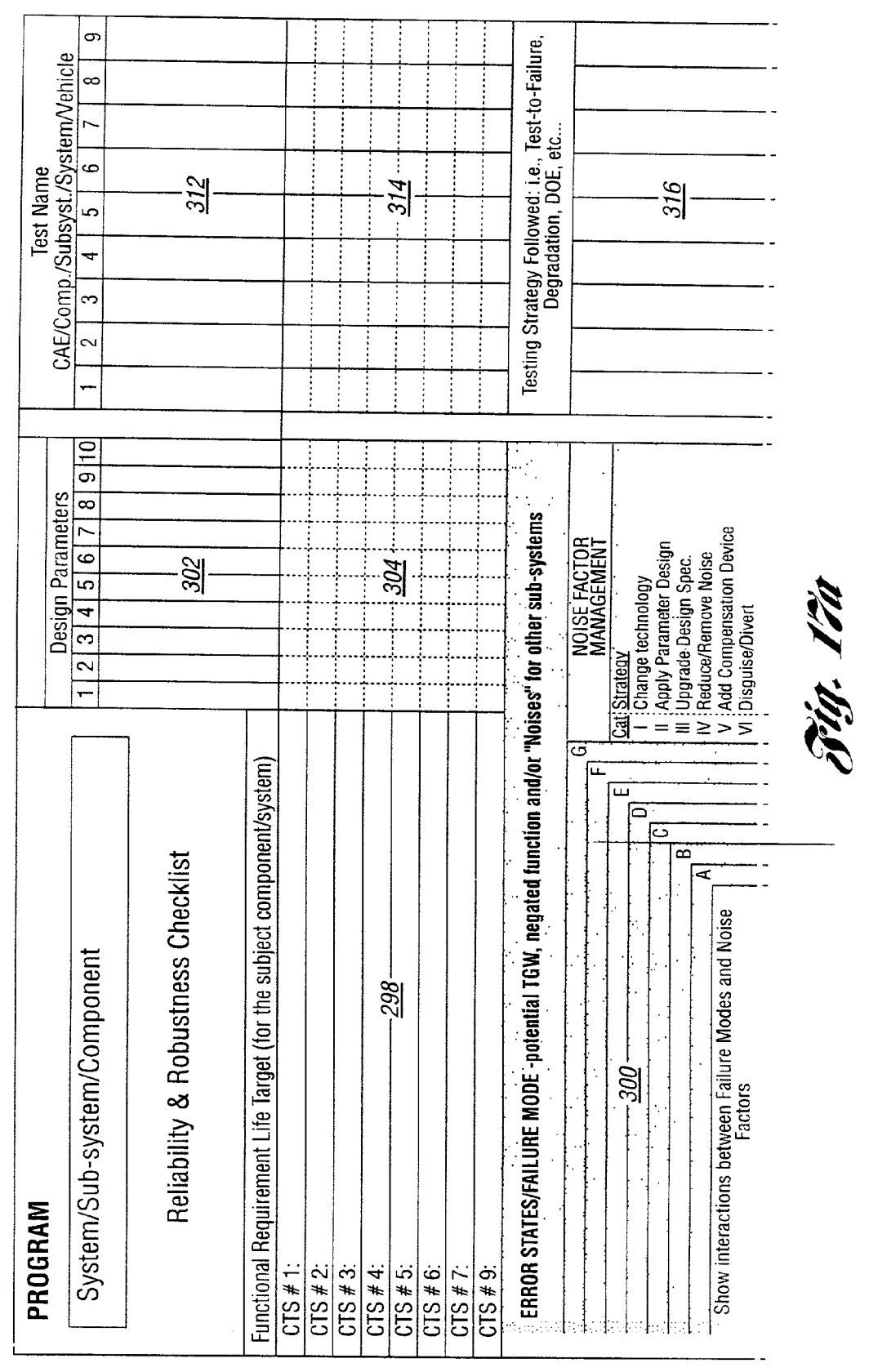

FIG. 16 is a block flow diagram illustrating a methodology 270 for developing a plan to attain and maintain a level of reliability and robustness (R&R) in accord with the Characterize aspect of the present invention. FIGS. 17a and 17b illustrate an (R&R) checklist for quantitatively and/or qualitatively defining and assessing the R&R plan. Notably, various aspects of the R&R planning methodology are addressed in greater detail with respect to the Optimize and Verify aspects of the present invention.

In accord with a preferred embodiment of the present invention, the R&R planning methodology begins, as represented in FIG. 16 (block 274), by listing all of the CTS aspects identified during the Define phase within region 298 of the R&R checklist shown in FIG. 17a. Next, as represented in FIG. 16 (block 276), potential error states and failure modes are identified for the overall system/subsystem/component and listed in region 300 of the R&R checklist. This data may be readily attained from various sources including FLEA/PFMEA data and other engineering data.

As represented in FIG. 16, block 278, the control factors x included in the corresponding transfer function are listed in region 302 of the R&R checklist. Next, any relationships between the listed CTS aspects and control factors are denoted in the R&R checklist matrix area 304. As represented in block 280, potential noise factors n are identified and listed in region 306 (FIG. 17b) of the R&R checklist. Although the R&R checklist illustrated in FIG. 17b contains five example noise categories, any variety or number of noise categories may be provided to best suit the particular product, system or process at issue.

Next, the failure mode/noise interaction matrix is generated in R&R checklist region 308, as represented in FIG. 16, block 282. Within the matrix, any interactions between failure modes and noise factors are specified to identify potential mechanisms of failure.

As represented in FIG. 16, block 284, a noise factor management strategy is initiated for key characteristics controlled by manufacturing processes (i.e., Noise 1). Notably, output from the Optimization aspect of the present invention is necessary before the noise management strategy can be initiated for the remaining noise categories (i.e., Noise 2 through Noise 5). Example noise factor management strategies in accord with the present invention include but are not limited to: changing existing technology, applying parameter design, upgrading current design specifications, reducing or removing noise, adding a noise compensation device, and disguising or diverting the noise. Tools for implementing noise factor management are well known and include but are not limited to process failure mode analyses (PFMA), process checks, statistical process control (SPC), and control planning.

As represented in FIG. 16, block 288, a potential test strategy is defined for measuring and evaluating the functional requirements (i.e., CTS Y's). In most cases, information for performing test strategies may be captured from corresponding design verification planning reports (DVPR), and input into R&R checklist region 312.

Next, any relationship between the test strategies (region 312) and the CTS aspects (region 298) is indicated in R&R checklist region 314, as represented in FIG. 16, block 290. Notably, any obvious "holes" or gaps identified in regions 314 or 318 should be addressed to ensure that at least one test strategy 312 exists for each CTS aspect 298 and noise 306, respectively.

Optimize

The Optimize aspect of the present invention includes several objectives. One objective is to understand the capability and stability of current manufacturing processes contributing to the overall product. Another objective is to understand and optimize the current robustness of the product itself. A third objective is to minimize product sensitivity to manufacturing noise. Yet another objective of the Optimize aspect is to minimize manufacturing process sensitivity to product and manufacturing variations.

Figure 18:
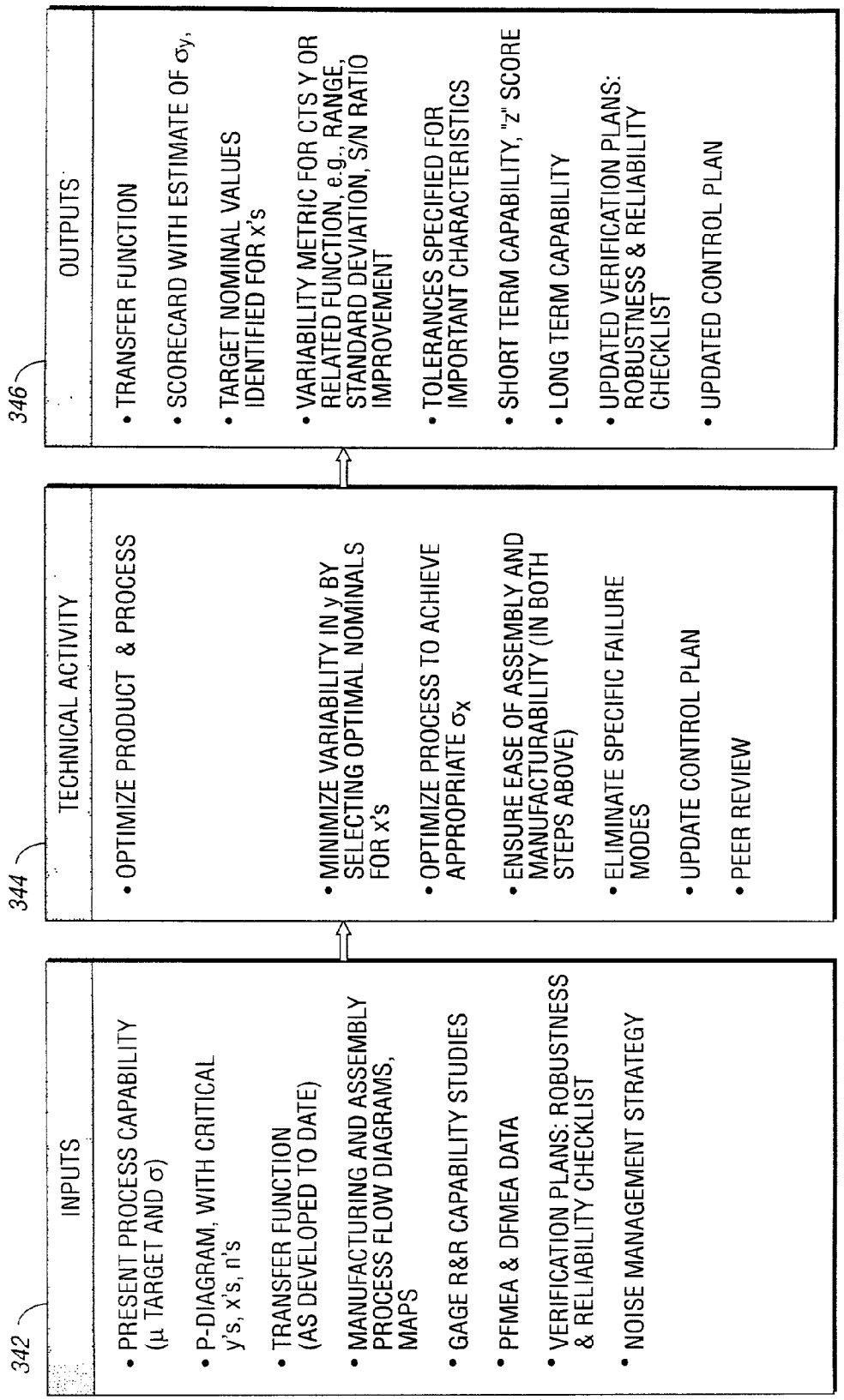
FIG. 18 is a block flow diagram illustrating an overview of the Optimized aspect of the present invention.

FIG. 18 is a block flow diagram illustrating an overview 340 of the Optimize aspect of the present invention. Inputs 342 include but are not limited to: present manufacturing process capabilities including Φ (mean), target Y and σy (variability) values; a P-Diagram including critical y, x and n criteria; an updated transfer function (as developed to date); manufacturing and assembly process flow diagrams and maps; robustness and reliability capability studies; PFMEA and DFMEA data; and verification plans including the R&R checklist and associated manufacturing noise management strategies.

Technical activity 344 associated with the Optimize aspect of the present invention includes minimizing variability in y values by selecting nominal x values, optimizing manufacturing processes as necessary to achieve the highest σy value possible, ensuring the ease of assembly and manufacturability of the product, eliminating specific failure modes, updating the overall control plan, and conducting a peer review.

Outputs 346 of the Optimize aspect of the present invention include an updated transfer function, a scorecard including an estimate of σy, target nominal x values, a variability metric for each CTS Y and related functions (e.g., range, standard deviation, S/N ratio improvement, etc.), tolerances specified for important product characteristics, a short-term Z-score capability, long-term product capabilities, updated verification plans including an updated R&R checklist, and an updated control plan.

More particularly, the Optimization aspect of the present invention seeks to identify design parameter settings or nominals x that, for each transfer function y achieve a target response in y with a minimum level of variability despite noises n, while satisfying all applicable system constraints.

Notably, transfer functions f(y) generated in accord with the present invention typically fall into two categories: linear and nonlinear. The impact that design parameters x have on the response in y varies greatly depending on the order of the corresponding transfer function. Consider the generic transfer functions y=f(x) plotted in FIGS. 19a and 19b. FIG. 19a illustrates a plot of a linear transfer function y=f(x) where the x-axis 351 reflects variability 350 associated with a control factor x and the y-axis 353 represents the resulting response or variability 352 in y due to the position of x. Because the transfer function f(x) plotted in FIG. 19a is linear, shifting the nominal value of x (e.g., from $x_a$ to $x_b$) does not impact the response 352 in y where variability 350 in x (e.g., manufacturing variability, etc.) remains constant.

In contrast, FIG. 19b demonstrates that with a nonlinear transfer function f(x), the response in y varies substantially depending upon the nominal value of control factor x where variability 350 in x remains constant. By adjusting the nominal value of x from $x_a$ to $x_b$, the variability experienced in y effectively "shrinks" from 354 to 356 based on the nominal position of x with respect to f(x).

Accordingly, where a transfer function generated in accord with the present invention is nonlinear, the nominal values of x may be optimized in the design phase of product development to desensitize the response in y to x variability, therefore yielding a more robust product design. To compensate for changes in nominal y values due to optimization of design parameters x contributing to nonlinear transfer functions, other y nominals that are based on linear transfer functions may be shifted without sacrificing response variability, as shown in FIG. 19a, to bring about the desired CTS Y with a minimum level of variability.

In the event that the target response in y or the target CTS Y cannot be obtained based on the optimization of nonlinear transfer function design parameters x and the shifting of linear transfer function design parameters x to compensate, conventional techniques for optimizing manufacturing processes may be implemented. One such technique involves the reduction of variability in x by decreasing manufacturing tolerances. Notably, the reduction of variability in x through the optimization of manufacturing processes is often substantially more expensive than optimizing product design parameters prior to the product being manufactured. Accordingly, attempts to reduce variability in x should take place only after nominal design parameters x contributing to their respective transfer functions are optimized to their full potential.

Other techniques for increasing the reliability and robustness of an overall product include physically strengthening the existing design or changing the overall design concept altogether. Notably, a fundamental change in the overall design concept of a product will typically result in a new transfer function having unique design and noise parameters x and n respectively.

Referring now to FIGS. 20a and 20b, the effect noise n has on the response in y for a given x is shown. In FIG. 20a control factor x is unaffected by the combined impact of noises $N_1$ and $N_2$. Accordingly, shifting control factor x from $x_a$ to $x_b$ has no impact on the variability 358 experienced in y. In contrast, where the control factor x interacts with noise $N_1$ and $N_2$, as shown in FIG. 20b, adjusting (optimizing) the control factor x nominal from $x_b$ to $x_a$ substantially "shrinks" or desensitizes the response in y and, therefore, yields a more robust product design.

In accord with a preferred embodiment of the present invention, variability ($\sigma_y$) experienced in y based on a transfer function y=f(x) is defined according to Equation 1.

$$\text{Variability of } y = \sigma_y = \left[\left(\frac{\partial y}{\partial x_1}\right)^2 \sigma_{x1}^2 + \left(\frac{\partial y}{\partial x_2}\right)^2 \sigma_{x2}^2 + \ldots\right]^{\frac{1}{2}} \quad (1)$$

Referring to Equation 1, the value $$\left(\frac{\partial y}{\partial x_i}\right)$$

represents sensitivity or variability in y. For linear transfer functions, is constant. For nonlinear transfer functions, however, $$\left(\frac{\partial y}{\partial x}\right)$$

varies and can, therefore, be optimized during product design and development, as illustrated and described with respect to FIGS. 19 and 20. Referring again to Equation 1, the value $\sigma_{x1}^2$ represents variability in y due to manufacturing process variability in x.

In manufacturing situations involving the assembly of various mechanical components, a statistical tolerancing methodology may be implemented to develop and/or improve upon an existing design concept and corresponding transfer function. The statistical tolerancing methodology primarily focuses on optimizing the sequence of component assembly, the degrees of freedom associated with assembly and design parameter nominals and tolerances to identify the most appropriate aspects of an overall product to optimize. Put another way, statistical tolerancing analyzes existing manufacturing or product constraints to pinpoint the most effective or cost-efficient opportunities to optimize y in accord with the present invention. For example, a given CTS Y embodied in a physical mechanical assembly may have several contributing sources of variability $\sigma_y$. By simply adjusting the order of assembly, nominal x parameters, manufacturing tolerances and degrees of freedom associated with the design and assembly, some sources of variability in y might be identified whose optimization may be more cost-effective or have a more significant impact on the target and desired variability for the overall CTS Y as compared to other sources of variability. Accordingly, statistical tolerancing effectively prioritizes opportunities for increasing robustness in a given mechanical assembly.

Methodologies for implementing statistical tolerancing in accord with the present invention include techniques such as Worst Case Analyses and Monte Carlo Simulation which are well known and understood by those of ordinary skill in the field of manufacturing optimization methodologies.

FIGS. 21a and 21b illustrate a computer-implemented scorecard 370 for iteratively adjusting design parameters, manufacturing tolerances and noise/control factors associated with a given transfer function y=f(x,n) to approach a target y value while minimizing variability in y to an acceptable level. In accord with a preferred embodiment of the present invention, the scorecard 370 is implemented in a spreadsheet application having function solver capabilities. Suitable applications include Microsoft Excel, Borland Quatro-Pro and Lotus 1-2-3.

In cell 372, a user inputs a description of a y value currently being optimized (e.g., compression ratio). In cell 374, the user inputs the unit of measure for the y value (e.g., inches, centimeters, ratio, etc.). In cell 376, the user inputs the transfer function y=f(x,n) corresponding to the characteristic 372. In specification fields 378, the user inputs a target nominal value Φ, an upper specification limit (US) and a lower specification limit (LSL) for the characteristic.

In variables columns 380, the user inputs a description of control factors x and noise factors n contributing to the target y value (i.e., x and n variables included within transfer function 376), and a unit of measure for each x and n factor.

In range columns 382, the user inputs the broadest possible range for each x and n factor that the current product design concept can accommodate. In specification columns 384, the user inputs, for each x, a lower specification limit and an upper specification limit corresponding to a desired mean (nominal) value a for x.

In sample/database statistics columns 386, the user inputs a nominal value a and standard deviation σy for each x and n factor.

In accord with a preferred embodiment of the present invention, a function solver utility automatically calculates a predicted performance capability 388 (i.e., a, σy, etc.) for the product characteristic 372 based on the transfer function 376, and the user-specified a and σy values for each x and n parameter. In accord with a preferred embodiment of the present invention, Equation 1, or a derivative thereof, is programmatically solved by the function solver based on the transfer function 376 and user-input a and σy values 386 to predict an overall variability σy 390 in characteristic 372.

In further accord with a preferred embodiment of the present invention, the function solver utility is configured to calculate the relative percent that each factor x and n contributes to the overall variability in the product characteristic 372. Based on the contribution to variability each x and n factor has on overall product characteristic y, transfer function 376 may be modified to eliminate factors that have an insignificant impact on variability, as the expense for controls to measure and minimize such factors may not be cost-effective given their low impact level.

A systematic or iterative process of adjusting a and σy for each control factor x is implemented to attain the most favorable a 392 and σy 390 for characteristic 372. It is additionally preferred that the a nominal design values for each control factor x are iteratively adjusted prior to adjusting the corresponding σy valves which reflect current manufacturing capabilities for each factor. Optimizing design parameters prior to increasing current manufacturing capabilities in this manner takes full advantage of relatively "free" product design opportunities before investing valuable time and resources to make more expensive improvements in current manufacturing capabilities.

Verify

The primary objectives of the Verify aspect of the present invention are twofold: to assess actual performance, reliability and manufacturing capabilities of the product after Optimization has taken place, and to demonstrate consumer-correlated performance over the product's life span.

Figure 22:
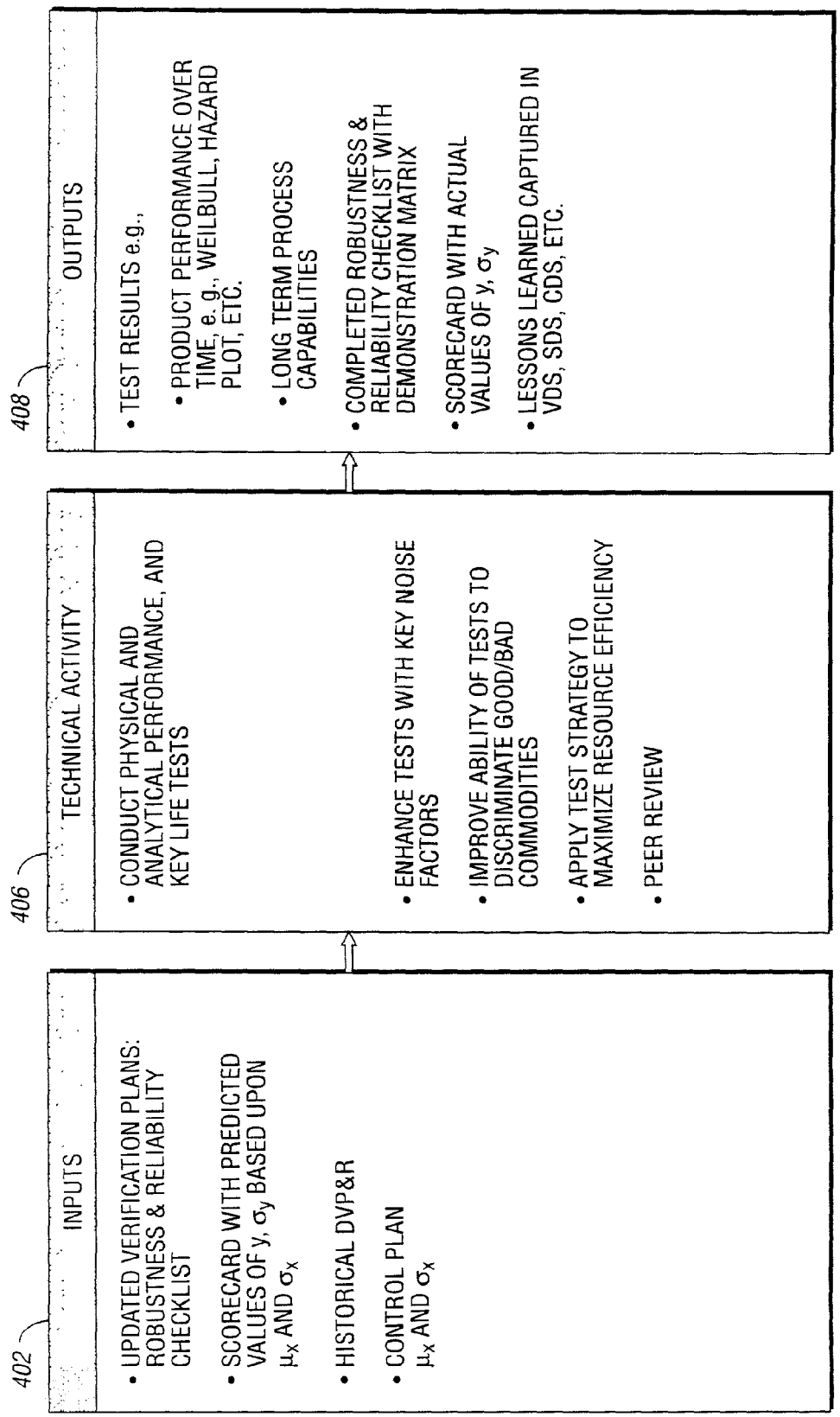
FIG. 22 is a block flow diagram illustrating an overview of the verify aspect of the present invention.

FIG. 22 is a block flow diagram illustrating an overview 400 of the Verify aspect of the present invention. Inputs 402 to the Verify aspect include but are not limited to an updated verification plan including an updated R&R checklist, the scorecard illustrated in FIG. 21 with predicted values of y and $\sigma_y$, based on $\mu_x$ and $\sigma_x$, a historical DVP&R and a product and manufacturing process control plan.

Technical activity 404 associated with the Verify aspect of the present invention includes conducting physical and analytical performance and key life tests, enhancing the tests with key noise factors, improving the ability of the tests to discriminate between good and bad commodities, applying a test strategy to maximize resource efficiency, and peer review.

Outputs 406 associated with the Verify aspect of the present invention include an assessment of product performance over time including long term robustness capabilities, a completed R&R checklist including a demonstration matrix, a score card with actual y and $\sigma_y$, values and lessons learned.

While the best mode for carrying out the invention has been described in detail, those familiar with the art to which this invention relates will recognize various alternative designs and embodiments for practicing the invention as defined by the following claims.

What is claimed:

1. A method for product optimization, the method comprising:
   identifying at least one aspect of a product that is critical to customer satisfaction and a target value for at least one aspect;
   characterizing the at least one aspect in terms of at least one contributing factor y, and characterizing the at least one contributing factor y in terms of at least one control factor x wherein the at least one contributing factor y is additionally characterized in terms of at least one contributing noise factor n and a transfer function y=f(x,n);
   receiving input defining a nominal value and a variability value for the at least one noise factor n;
   outputting a nominal and a variability value the at least one contributing factor y based on the transfer function, a nominal design value and variability value for the at least one control factor x, and the nominal value and the variability value for the at least one noise factor n; and
   adjusting nominal design values for the at least one control factor x such that variability in the at least one contributing factor y is minimized and the target value for the at least one aspect is attained thereby optimizing the product.

2. The method of claim 1 wherein the at least one aspect and target value for the at least one aspect are identified based on consumer insight.

3. The method of claim 1 further comprising identifying a target value for the at least one aspect in an aged condition; and
   minimizing variability in the at least one contributing factor such that the target value for the at least one aspect in the aged condition is attained.

4. The method of claim 1 additionally comprising minimizing variability in the at least one contributing factor by reducing variability in the at least one control factor.

5. The method of claim 1 wherein the variability in the at least one contributing factor is reduced to a 6σ level.

6. The method of claim 1 further comprising assessing the extent to which the target value is attained over the product life.

7. A computer-implemented system for facilitating product optimization, the system configured to:
   receive input defining a transfer function characterizing a contributing factor y to a product aspect that is critical to customer satisfaction in terms of at least one control factor x for the contributing factor y;
   receive input defining a nominal design value and a variability value for the at least one control factor x; and
   output a mean and variability value for the contributing factor y based on the transfer function and the nominal and variability values for the at least one control factor x wherein a transfer function y=f(x,n) characterizes the contributing factor y in terms of the at least one control factor x and at least one noise factor n, the system additionally configured to receive input defining a nominal value and a variability value for each at least one noise factor n and output a nominal and a variability value for the contributing factor y based on the transfer function, the nominal design value and variability value for the at least one control factor x, and the nominal value and the variability value for the at least one noise factor n thereby facilitating product optimization.

8. The system of claim 7 wherein the variability in the contributing factor is reduced in response to input adjusting the nominal design value(s) for the at least one control factor.

9. The system of claim 7 wherein the variability in the contributing factor is reduced in response to input reducing the variability value(s) for the at least one control factor.

10. The system of claim 8 or 9 wherein the variability of the contributing factor is reduced to a 6σ level.

11. A method for product optimization, the method comprising:
    a step for identifying at least one aspect of a product that is critical to customer satisfaction and a target value for the at least one aspect;
    a step for characterizing the at least one aspect in terms of at least one contributing factor y;
    a step for characterizing the at least one contributing factor y in terms of at least one control factor x and at least one noise factor n wherein the step for characterizing the at least one contributing factor y involves a step for defining a transfer function y=f(x,n);
    a step for receiving input defining a nominal value and a variability value for the at least one noise factor n;
    a step for outputting a nominal and a variability value for the at least one contributing factor y based on the transfer function, a nominal design value and variability value for the at least one control factor x, and the nominal value and the variability value for the at least one noise factor n; and
    a step for minimizing variability in the at least one contributing factor y such that the target value for the aspect is attained thereby optimizing the product.

12. The method of claim 11 wherein the step for minimizing variability in the at least one contributing factor involves adjusting a nominal design value for the at least one control factor.

13. The method of claim 11 wherein the step for minimizing variability in the at least one contributing factor involves reducing variability in the at least one control factor.

14. The method of claim 11 additionally comprising a step for assessing the extent to which the target value for the aspect is attained over the product life.

15. A computer-implemented system for facilitating product optimization, the system comprising:
    a means for receiving a transfer function y=f(x,n) characterizing a contributing factor y to a product aspect that is critical to customer satisfaction in terms of at least one control factor x and at least one noise factor n;
    a means for receiving a nominal design value and a variability value for the at least one control factor x;
    a means for defining a nominal value and a variability value for the at least one noise factor n; and
    a means for computing a mean and variability value for the contributing factor y based on the transfer function, the nominal design and variability values for the at least one control factor x, and the nominal and variability value for the at least one noise factor n thereby facilitating product optimization.

* * * * *